(12) United States Patent
Hancock et al.

(10) Patent No.: US 10,834,063 B2
(45) Date of Patent: Nov. 10, 2020

(54) FACILITATING PROVISIONING OF AN OUT-OF-BAND PSEUDONYM OVER A SECURE COMMUNICATION CHANNEL

(71) Applicant: AT&T Intellectual Property I, L.P., Atlanta, GA (US)

(72) Inventors: Paul Hancock, Tower Lakes, IL (US); Stuart Steele, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 215 days.

(21) Appl. No.: 15/849,658

(22) Filed: Dec. 20, 2017

(65) Prior Publication Data

US 2019/0014096 A1 Jan. 10, 2019

Related U.S. Application Data

(63) Continuation of application No. 15/643,142, filed on Jul. 6, 2017.

(51) Int. Cl.
*H04L 29/06* (2006.01)
*H04L 9/32* (2006.01)
(Continued)

(52) U.S. Cl.
CPC .......... *H04L 63/0478* (2013.01); *G06F 21/42* (2013.01); *H04L 9/3263* (2013.01);
(Continued)

(58) Field of Classification Search
None
See application file for complete search history.

(56) References Cited

U.S. PATENT DOCUMENTS 6,157,829 A 12/2000 Grube et al.
6,373,949 B1 4/2002 Aura et al.
(Continued)

FOREIGN PATENT DOCUMENTS

CN 101720086 B 12/2011
CN 101959183 B 1/2013
(Continued)

OTHER PUBLICATIONS

Kaufman et al.; RFC 5996—Internet Key Exchange Protocol Version 2 (IKEv2); 2010; Retrieved from the Internet <URL: https://tools.ietf.org/html/rfc5996>; pp. 1-138, as printed. (Year: 2010).*
(Continued)

*Primary Examiner* — Saleh Najjar
*Assistant Examiner* — Michael W Chao
(74) *Attorney, Agent, or Firm* — Amin, Turocy & Watson, LLP

(57) ABSTRACT

Facilitation of out-of-band pseudonym provisioning for a subscriber of a device is provided herein. In one embodiment, a method comprises: receiving, by a device comprising a processor, one way authentication data from a secure server; transmitting, by the device, to the secure server, via a secure communication channel, an identifier for a subscriber of the device, wherein the transmitting is performed based on the receiving the one way authentication data from the secure server; and receiving, by the device from the secure server, a pseudonym, wherein the pseudonym enables access by the device to an authentication device at a first time.

20 Claims, 13 Drawing Sheets

(51) Int. Cl.
*H04W 12/00* (2009.01)
*G06F 21/42* (2013.01)
*H04L 9/06* (2006.01)

(52) U.S. Cl.
CPC ........ *H04L 63/061* (2013.01); *H04L 63/0853* (2013.01); *H04L 63/18* (2013.01); *H04W 12/00514* (2019.01); *H04L 9/0662* (2013.01); *H04L 9/3228* (2013.01); *H04L 63/0281* (2013.01); *H04L 63/0442* (2013.01); *H04L 63/08* (2013.01); *H04L 63/166* (2013.01)

(56) References Cited

U.S. PATENT DOCUMENTS

| | | |
|---|---|---|
| 6,556,820 B1 | 4/2003 | Le et al. |
| 7,289,805 B2 | 10/2007 | Tom et al. |
| 7,516,330 B2 | 4/2009 | Ellison et al. |
| 7,738,922 B2 | 6/2010 | Hashimoto et al. |
| 7,770,204 B2 | 8/2010 | Pathakis et al. |
| 8,145,212 B2 | 3/2012 | Lopresti et al. |
| 8,234,694 B2 | 7/2012 | Youn et al. |
| 8,245,039 B2 | 8/2012 | Jones |
| 8,385,889 B2 | 2/2013 | Ishikawa |
| 8,462,742 B2 | 6/2013 | Song et al. |
| 8,463,258 B2 | 6/2013 | Parsons et al. |
| 8,483,166 B2 | 7/2013 | Guo |
| 8,767,526 B1* | 7/2014 | Jagannatharao ...... H04L 63/205 370/216 |
| 8,881,257 B2 | 11/2014 | Cha et al. |
| 9,015,815 B2 | 4/2015 | Frelechoux |
| 9,020,467 B2 | 4/2015 | Zhang et al. |
| 9,178,880 B1 | 11/2015 | Dotan et al. |
| 9,191,374 B1 | 11/2015 | Kim |
| 9,398,440 B2 | 7/2016 | Paz et al. |
| 9,412,278 B1 | 8/2016 | Gong et al. |
| 9,549,322 B2 | 1/2017 | Badenhorst |
| 9,591,560 B2 | 3/2017 | Kotecha |
| 9,614,848 B2 | 4/2017 | Yeleswarapu et al. |
| 9,686,675 B2 | 6/2017 | Ketheesan et al. |
| 9,699,170 B2 | 7/2017 | Sondhi et al. |
| 9,749,979 B2 | 8/2017 | Puusaari et al. |
| 9,792,613 B2 | 10/2017 | Gong et al. |
| 9,805,372 B2 | 10/2017 | Gong et al. |
| 9,805,607 B2 | 10/2017 | Gong et al. |
| 9,860,234 B2 | 1/2018 | Sondhi et al. |
| 9,870,566 B2 | 1/2018 | Gong et al. |
| 10,264,450 B2 | 4/2019 | Vicente Ruggiero et al. |
| 10,299,120 B2 | 5/2019 | Nilsson et al. |
| 10,299,123 B2 | 5/2019 | Vasudevan et al. |
| 10,361,839 B2* | 7/2019 | Buckley ................ H04L 9/002 |
| 10,412,666 B2* | 9/2019 | Hedberg ............... H04W 12/06 |
| 10,462,699 B2* | 10/2019 | Grayson ............... H04W 60/00 |
| 10,469,467 B2* | 11/2019 | Cooke .................. H04L 9/0827 |
| 10,470,030 B2* | 11/2019 | Campbell .............. H04W 8/04 |
| 10,554,410 B2* | 2/2020 | Lee ...................... H04L 63/0838 |
| 10,645,572 B2* | 5/2020 | Lindheimer ............ H04W 8/26 |
| 2002/0156906 A1 | 10/2002 | Kadyk et al. |
| 2004/0030932 A1 | 2/2004 | Juels et al. |
| 2004/0066769 A1* | 4/2004 | Ahmavaara ......... H04L 12/2856 370/338 |
| 2004/0193891 A1* | 9/2004 | Ollila .................. H04L 63/123 713/182 |
| 2004/0268122 A1* | 12/2004 | Satarasinghe ....... H04L 63/0838 713/159 |
| 2005/0010680 A1* | 1/2005 | Zick .................. H04W 12/0609 709/237 |
| 2005/0076142 A1 | 4/2005 | Chin |
| 2005/0081045 A1 | 4/2005 | Nicodemus et al. |
| 2005/0124288 A1* | 6/2005 | Karmi ................ H04L 12/5692 455/3.01 |
| 2005/0177515 A1 | 8/2005 | Kalavade et al. |
| 2005/0250539 A1* | 11/2005 | Veron ................. H04L 63/0407 455/558 |
| 2005/0251681 A1* | 11/2005 | Robles ................. H04L 9/0844 713/172 |
| 2005/0268107 A1 | 12/2005 | Harris et al. |
| 2006/0019635 A1* | 1/2006 | Ollila ..................... H04L 63/08 455/411 |
| 2006/0064493 A1 | 3/2006 | Hammell et al. |
| 2006/0282880 A1* | 12/2006 | Haverinen .......... H04L 63/1458 726/3 |
| 2007/0021105 A1 | 1/2007 | Patel |
| 2007/0179906 A1 | 8/2007 | Frankel et al. |
| 2008/0014931 A1 | 1/2008 | Yared et al. |
| 2008/0091618 A1 | 4/2008 | Obrea et al. |
| 2009/0199276 A1 | 8/2009 | Schneider |
| 2010/0004019 A1 | 1/2010 | Di Caprio et al. |
| 2010/0041402 A1 | 2/2010 | Gallagher et al. |
| 2010/0050243 A1 | 2/2010 | Hardt |
| 2010/0056106 A1 | 3/2010 | Korhonen et al. |
| 2010/0091733 A1* | 4/2010 | Hahn ..................... H04L 63/08 370/331 |
| 2010/0180111 A1* | 7/2010 | Hahn .................... H04W 12/06 713/150 |
| 2011/0004762 A1* | 1/2011 | Horn ..................... H04W 12/04 713/171 |
| 2011/0078773 A1 | 3/2011 | Bhasin et al. |
| 2011/0086616 A1 | 4/2011 | Brand et al. |
| 2011/0098030 A1 | 4/2011 | Luoma |
| 2011/0117881 A1 | 5/2011 | Luoma et al. |
| 2011/0239281 A1 | 9/2011 | Sovio et al. |
| 2011/0239282 A1 | 9/2011 | Svarfvar et al. |
| 2011/0268022 A1 | 11/2011 | Xu |
| 2011/0269422 A1 | 11/2011 | Xu et al. |
| 2011/0269461 A1 | 11/2011 | Xu et al. |
| 2011/0269472 A1 | 11/2011 | Xu et al. |
| 2011/0270747 A1 | 11/2011 | Xu |
| 2011/0302412 A1 | 12/2011 | Deng et al. |
| 2012/0204231 A1* | 8/2012 | Holtmanns ..... H04W 12/04031 726/3 |
| 2012/0284785 A1 | 11/2012 | Salkintzis et al. |
| 2012/0310720 A1 | 12/2012 | Balsan et al. |
| 2013/0007849 A1 | 1/2013 | Coulter et al. |
| 2013/0007858 A1* | 1/2013 | Shah .................. H04L 63/0815 726/6 |
| 2013/0067552 A1* | 3/2013 | Hawkes ............... H04L 63/166 726/7 |
| 2013/0179692 A1 | 7/2013 | Tolba et al. |
| 2014/0047510 A1* | 2/2014 | Belton .............. H04L 12/0609 726/4 |
| 2014/0047513 A1 | 2/2014 | Van't Noordende |
| 2014/0093071 A1 | 4/2014 | Qiang |
| 2014/0099916 A1 | 4/2014 | Mallikarjunan et al. |
| 2014/0185597 A1* | 7/2014 | Gupta .................. H04L 63/083 370/338 |
| 2014/0244514 A1 | 8/2014 | Rodriguez et al. |
| 2014/0256286 A1 | 9/2014 | Rangarajan |
| 2014/0258110 A1 | 9/2014 | Davis et al. |
| 2014/0325025 A1 | 10/2014 | Yeleswarapu et al. |
| 2015/0029939 A1* | 1/2015 | Fujinami ............. H04W 12/08 370/328 |
| 2015/0089569 A1 | 3/2015 | Sondhi et al. |
| 2015/0227922 A1 | 8/2015 | Filler |
| 2015/0237049 A1 | 8/2015 | Grajek et al. |
| 2015/0327065 A1* | 11/2015 | Mildh ................... H04W 12/06 455/411 |
| 2015/0381611 A1 | 12/2015 | Mestanov et al. |
| 2016/0028737 A1 | 1/2016 | Srinivasan et al. |
| 2016/0044440 A1 | 2/2016 | Cha et al. |
| 2016/0087972 A1* | 3/2016 | Ahmavaara ......... H04L 63/0823 726/10 |
| 2016/0112896 A1* | 4/2016 | Karampatsis ..... H04W 28/0252 370/230.1 |
| 2016/0227471 A1* | 8/2016 | De Foy ................ H04W 48/18 |
| 2016/0344559 A1* | 11/2016 | Ma ........................ H04L 9/3263 |
| 2016/0381019 A1 | 12/2016 | Modi et al. |
| 2017/0024733 A1 | 1/2017 | Purves |
| 2017/0048702 A1 | 2/2017 | Barrett et al. |
| 2017/0149837 A1 | 5/2017 | Sondhi et al. |
| 2017/0150469 A1 | 5/2017 | Puusaari et al. |
| 2017/0164200 A1* | 6/2017 | Naslund ............... H04L 63/0428 |

(56) References Cited

U.S. PATENT DOCUMENTS

| | | | |
|---|---|---|---|
| 2017/0169713 A1 | 6/2017 | Gong et al. | |
| 2017/0228732 A1 | 8/2017 | Badenhorst | |
| 2017/0230825 A1* | 8/2017 | Counterman | H04W 12/06 |
| 2017/0245143 A1* | 8/2017 | Lindheimer | H04W 8/26 |
| 2017/0302641 A1 | 10/2017 | Ramatchandirane et al. | |
| 2017/0302655 A1 | 10/2017 | Sondhi et al. | |
| 2017/0346916 A1 | 11/2017 | Kim | |
| 2018/0063111 A1* | 3/2018 | Vasudevan | H04W 12/06 |
| 2018/0124597 A1* | 5/2018 | Malthankar | H04L 63/0823 |
| 2018/0255106 A1* | 9/2018 | Wiesmaier | H04L 63/205 |
| 2018/0324583 A1 | 11/2018 | Nair et al. | |
| 2018/0367296 A1 | 12/2018 | Norrman et al. | |
| 2019/0215691 A1 | 7/2019 | Salkintzis | |
| 2019/0246275 A1 | 8/2019 | Nakarmi et al. | |
| 2019/0289462 A1* | 9/2019 | Kim | H04W 12/0401 |
| 2019/0289465 A1* | 9/2019 | Counterman | H04L 63/0807 |
| 2019/0372955 A1* | 12/2019 | Bettenburg | H04L 63/0838 |

FOREIGN PATENT DOCUMENTS

| | | |
|---|---|---|
| CN | 101969638 B | 8/2013 |
| EP | 1788792 A1 | 5/2007 |
| EP | 1993310 A1 | 11/2008 |
| WO | 2016209126 A1 | 12/2016 |
| WO | 2017016330 A1 | 2/2017 |
| WO | 2017102020 A1 | 6/2017 |

OTHER PUBLICATIONS

Final Office Action received for U.S. Appl. No. 15/643,142 dated Apr. 3, 2019, 21 pages.

Notice of Allowance dated Jul. 18, 2018 for U.S. Appl. No. 15/628,883, 28 pages.

Office Action dated Nov. 28, 2018 for U.S. Appl. No. 15/643,142, 37 pages.

Sher et al., "3G-WLAN Convergence: Vulnerability, Attacks Possibilities and Security Model," Second International Conference on Availability, Reliability and Security (ARES'07), 2007, IEEE, 8 pages.

Samfat et al., "A Method Providing Identity Privacy to Mobile Users During Authentication," Workshop on Mobile Computing Systems and Applications, 1994, IEEE, 5 pages.

Kesdogan et al., "Distributed Temporary Pseudonyms: A New Approach for Protecting Location Information in Mobile Communication Networks, "European Symposium on Research in Computer Security (ESORICS'98), 1998, Springer-Verlag, 16 pages.

Van Den Broek et al., "Defeating IMSI Catchers," Proceedings of the 22nd ACM SIGSAC Conference on Computer and Communications Security, Oct. 2015, ACM, 12 pages.

Arkko et al., "RFC 4187—Extensible Authentication Protocol Method for 3rd Generation Authentication and Key Agreement," (EAP-AKA), Jan. 2006, The Internet Society, 80 pages. https://tools.ietf.org/html/rfc4187.

Arkko et al., "RFC 5448—Improved Extensible Authentication Protocol Method for 3rd Generation Authentication and Key Agreement (EAP-AKA')," May 2009, IETF Trust, 30 pages. https://tools.ietf.org/html/rfc5448.

Office Action dated Jan. 31, 2018 for U.S. Appl. No. 15/628,883, 28 pages.

Non-Final Office Action received for U.S. Appl. No. 15/643,142 dated Aug. 29, 2019, 17 pages.

Final Office Action received for U.S. Appl. No. 15/643,142 dated Jan. 7, 2020, 35 pages.

* cited by examiner

FACILITATING PROVISIONING OF AN OUT-OF-BAND PSEUDONYM OVER A SECURE COMMUNICATION CHANNEL

RELATED APPLICATION

This patent application is a continuation of, and claims priority to, U.S. patent application Ser. No. 15/643,142, filed Jul. 6, 2017, and entitled "FACILITATING PROVISIONING OF AN OUT-OF-BAND PSEUDONYM OVER A SECURE COMMUNICATION CHANNEL," the entirety of which application is hereby incorporated by reference herein.

TECHNICAL FIELD

The subject disclosure relates generally to communications systems, and, for example, to systems, methods and/or machine-readable storage media for facilitating provisioning of an out-of-band pseudonym over a secure communication channel.

BACKGROUND

Extensible Authentication Protocol (EAP) authentication methods, such as EAP-Authentication and Key Agreement (AKA), can provide cryptographically secure pseudonyms to a device for use in place of permanent identifiers. For some implementations, this is done by distributing shared keys to each device. This is easily compromised and EAP methods avoid this vulnerability by encrypting a permanent identifier using a key known only to the authentication server and then distributing the key to the device for later use. While preventing encryption key compromise, this method requires the device to obtain a pseudonym before the device can use the encryption key (e.g., for the first connection to the network, or periodically as the server demands). This necessitates the device to occasionally present the permanent identifier to the authentication server in order to obtain a valid pseudonym. However, presentation of the permanent identifier can lead to eavesdropping due to leakage and a privacy and/or security compromise for a subscriber or subscriber device.

DETAILED DESCRIPTION

Figure 1:
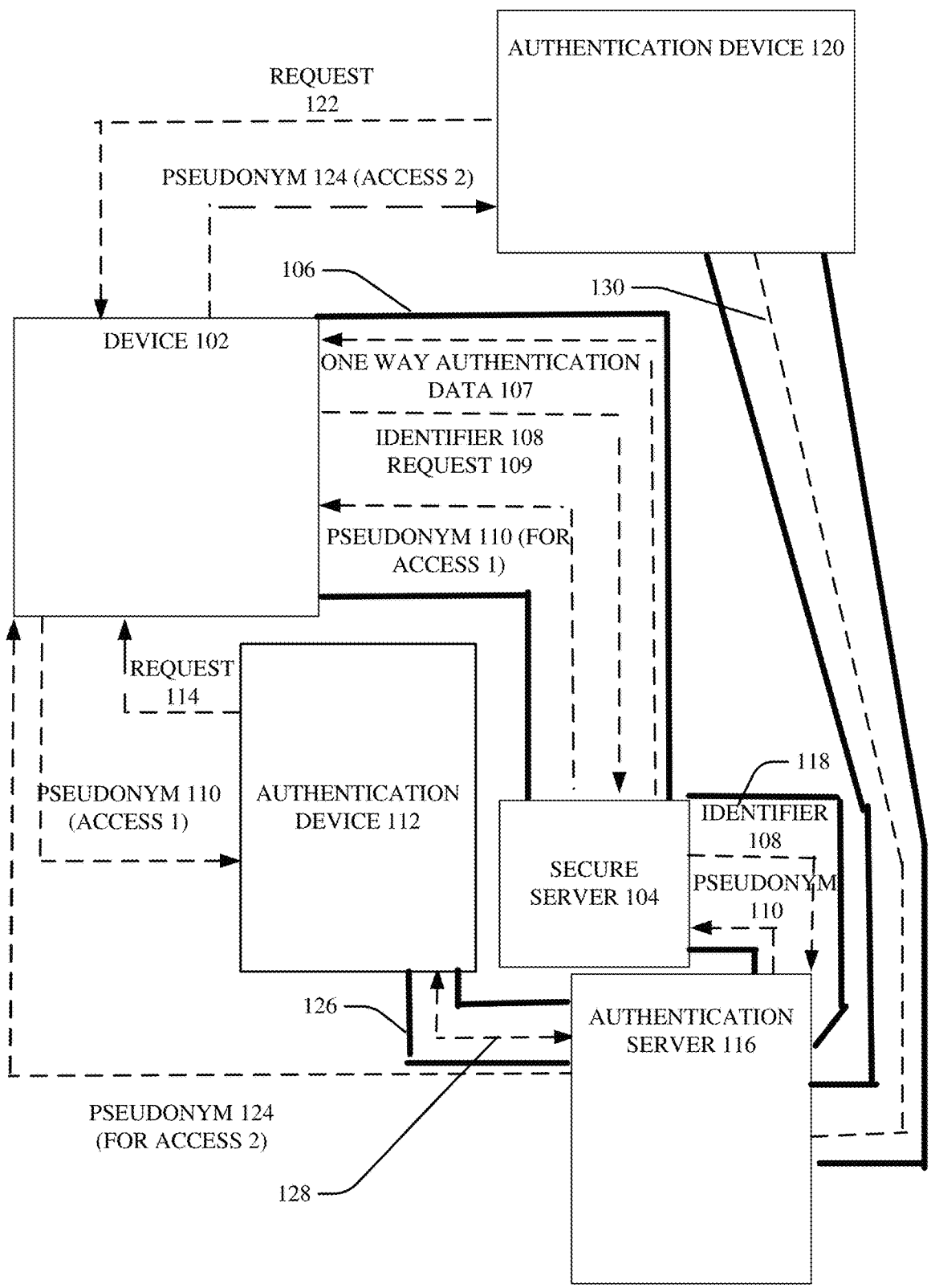
FIG. 1 illustrates an example, non-limiting system that facilitates provisioning of an out-of-band pseudonym over a secure communication channel in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)," "gNB" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Some EAP methods, such as EAP-AKA, rely on retrieving home subscriber server (HSS) credentials based on the subscriber's International Mobile Subscriber Identifier (IMSI). There can be a permanent identifier associated with the device for the subscriber and, in some cases, the permanent identifier (which is referred to herein as the "identifier") can be the IMSI. As used herein, the terms "identifier" and "identity" can be interchangeable. In other cases, the permanent identifier can be another number or a series of letters and/or numbers or other symbols. The permanent identifier can be associated with the subscriber, in some cases (similar to how a social security number (SSN), a credit card number or a license plate of a car is associated with a person). As with the SSN or credit card number, a subscriber will often prefer to not have the permanent identifier for the subscriber and/or for the subscriber's device leaked (or otherwise accessed or accessible by third-parties that are not authorized to have or obtain the information).

In particular, Extensible Authentication Protocol (EAP) authentication methods, such as EAP-Authentication and Key Agreement (AKA). AKA can provide cryptographically secure temporary identities to a device (e.g., mobile device) for use in place of permanent identities. For some implementations, this is done by distributing shared keys to each device. This is easily compromised and EAP methods avoid this vulnerability by encrypting a permanent identifier using a key known only to the server and then distributing it to the device for later use. While preventing encryption key compromise, this method requires the device to obtain a pseudonym before the device can use one (e.g., for the first connection to the network, or periodically as server demands). This necessitates the device to occasionally present the permanent identifier for the device to the authentication server in order to obtain a valid pseudonym.

Accordingly, in EAP methods, in order to connect to an authentication device (which may be an access point or other device to which the device communicates at a particular location), the device must inform the authentication server of the device IMSI. The IMSI may be transmitted in the clear or encrypted so that proper credentials can be retrieved for authentication of the device and subsequent access by the device of the authentication device.

Current methods used for authentication using a Subscriber Identity Module (SIM) card exposes credentials, with the current method, in which the IMSI (or other permanent identifier) can be leaked, it is possible to track a subscriber (or subscriber device) using an IMSI or permanent identifier since the devices can leak the IMSI while going through their device operations. As such, due to the leakage, privacy information about where a device (and the subscriber for the device) is located can be obtained by eavesdroppers (or eavesdropping devices). The magnitude of the IMSI threat is not universally agreed upon. However, there is a movement in the industry to reduce and/or eliminate IMSI exposure.

In one or more embodiments described herein, the exposure of the IMSI can be eliminated and/or reduced to eliminate or reduce the likelihood of leakage of the IMSI (or other permanent identifier) and subsequent elimination or reduction of the possibility for eavesdropping. One or more embodiments described herein can be employed for any system and/or network operator that desires to improve subscriber privacy. For example, one or more embodiments described herein can be employed for any system and/or network operator utilizing a Universal Integrated Circuit Card (UICC) credential store that would like to improve subscriber privacy.

Systems, methods and/or machine-readable storage media for facilitating provisioning of an out-of-band pseudonym over a secure communication channel. One or more embodiments described herein can advantageously compensate for privacy vulnerability in existing authentication methods, such as Extensible Authentication Protocol (EAP) and/or EAP-Authentication and Key Agreement (AKA). In one or more embodiments, the improved privacy can be accomplished by establishing an out-of-band system and/or method for provisioning a pseudonym onto the device (e.g., fixed or mobile device) before the pseudonym is needed. One or more embodiments can be applied to current and future communication systems.

In one embodiment, a method can comprise: receiving, by a device comprising a processor, one way authentication data from a secure server; transmitting, by the device, to the secure server, via a secure communication channel, an identifier for a subscriber of the device, wherein the transmitting is performed based on the receiving the one way authentication data from the secure server; and receiving, by the device from the secure server, a pseudonym for the subscriber of the device, wherein the pseudonym enables access by the device to an authentication device at a first time.

In another embodiment, a machine-readable storage medium is provided. The machine-readable storage medium can comprise executable instructions that, when executed by a processor of a mobile device, facilitate performance of operations. The operations can comprise: obtaining one way authentication data from a secure server; sending, to the secure server, via a secure communication channel, an identifier for a subscriber of the mobile device, wherein the sending is performed based on the obtaining the one-way authentication data from the secure server; and obtaining, from the secure server, a pseudonym, wherein the pseudonym enables access by the device to an authentication device at a first time.

In another embodiment, a first device can comprise: a processor; and a memory that stores executable instructions that, when executed by the processor, facilitate performance of operations. The operations can comprise: receiving, from a second device, an identifier for the second device based on transmission to the second device of one way authentication data for the first device, wherein the receiving is performed via a secure communication channel; and authenticating the second device employing the identifier, and receiving from a secure server a pseudonym for the second device, wherein the receiving from the secure server is performed via a second secure communication channel.

In another embodiment, a machine-readable storage medium is provided. The machine-readable storage medium can comprise executable instructions that, when executed by a processor of a mobile device, facilitate performance of operations. The operations can comprise: receiving one way authentication data from a secure server; transmitting, to the secure server, via a secure communication channel, an identifier for a subscriber of the mobile device, wherein the transmitting is performed based on the receiving the one-way authentication data from the secure server; and obtaining, from the secure server, a pseudonym, wherein the pseudonym enables access by the device to an authentication device at a first time.

In another embodiment, a device comprises a processor; and a memory that stores executable instructions that, when executed by the processor, facilitate performance of operations. The operations can comprise: receiving, from a second device, an identifier for a subscriber of the second device based on transmission to the second device of one way authentication data for the device, wherein the receiving is performed over a secure communication channel; and authenticating a subscriber of the second device employing the identifier, and receiving from a secure server a pseudonym for a subscriber of the second device, wherein the receiving from the secure server is performed over a second secure communication channel.

One or more embodiments can avoid or reduce the likelihood of the inevitable permanent identifier exposure existing in current methods and standards. With the method described here, subscribers and/or device associated with subscribers will not be susceptible to permanent identifier tracking because their permanent identities are never exposed. This premiere and enhanced consumer privacy can lead to stronger branding, customer loyalty and trust.

Figure 2:
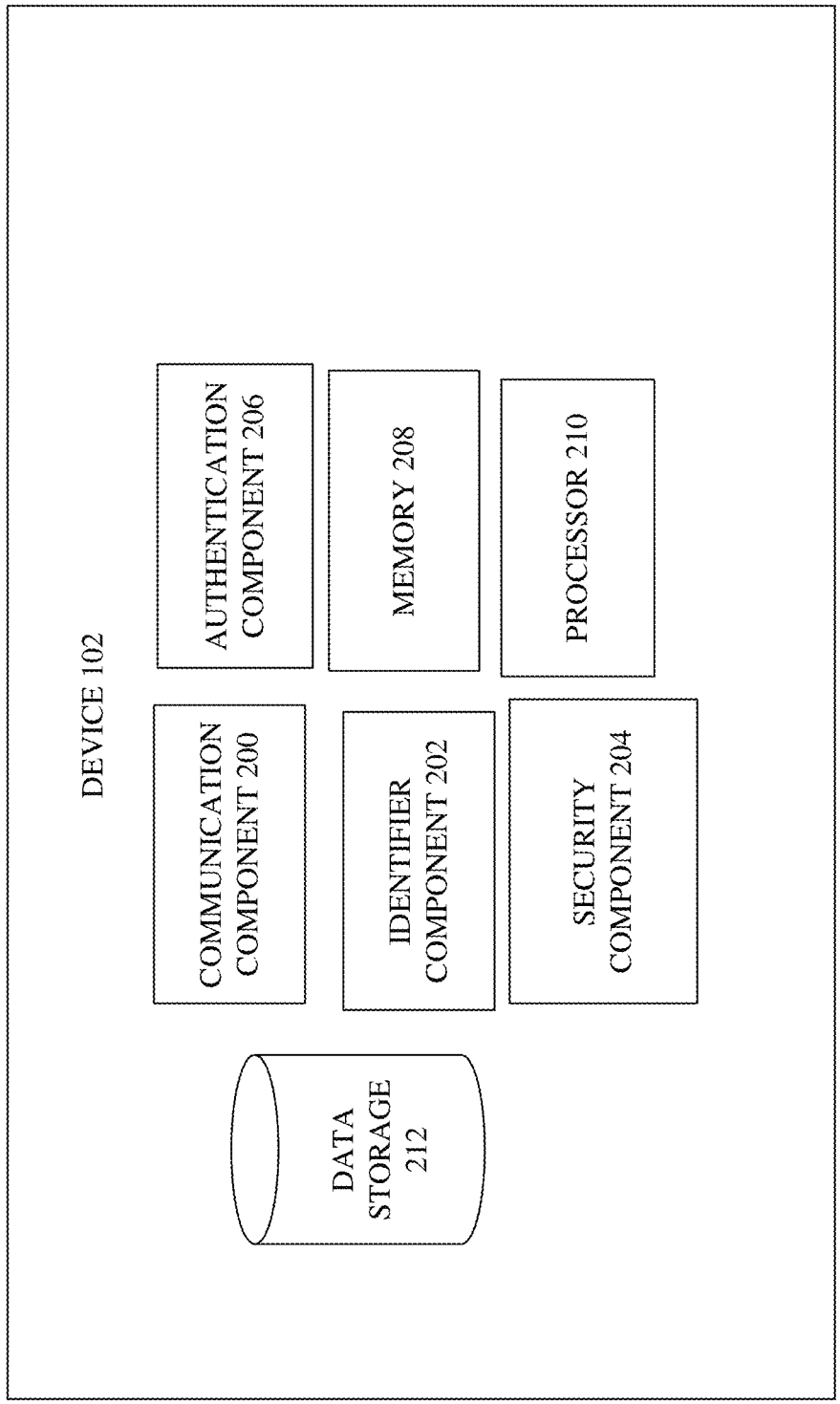
FIG. 2 illustrates an example, non-limiting block diagram of mobile device for which an out-of-band pseudonym can be provisioned over a secure communication channel in accordance with one or more embodiments described herein.
Figure 3:
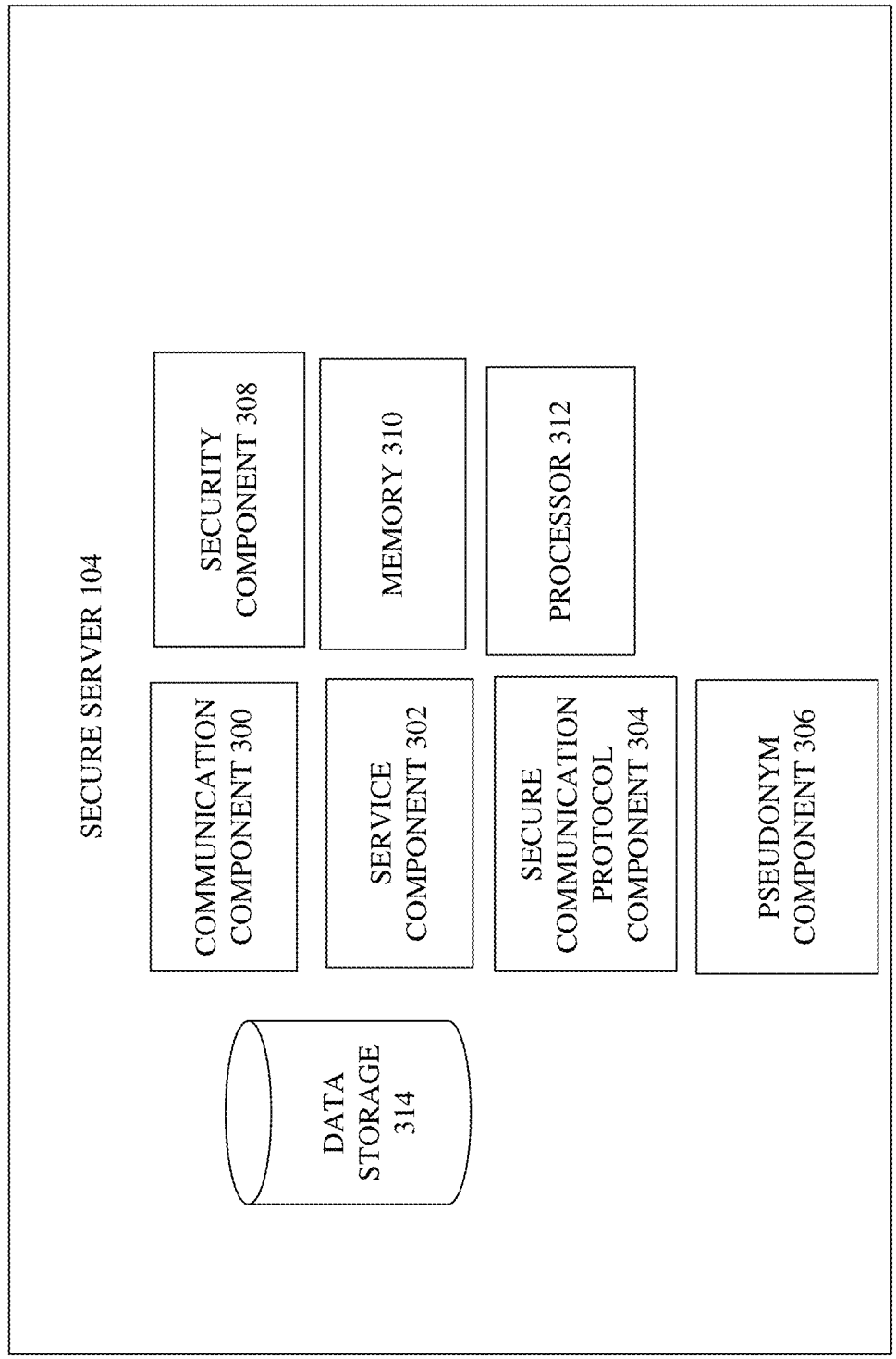
FIG. 3 illustrates an example, non-limiting block diagram of a secure server that facilitates provisioning of an out-of-band pseudonym over a secure communication channel in accordance with one or more embodiments described herein.
Figure 4:
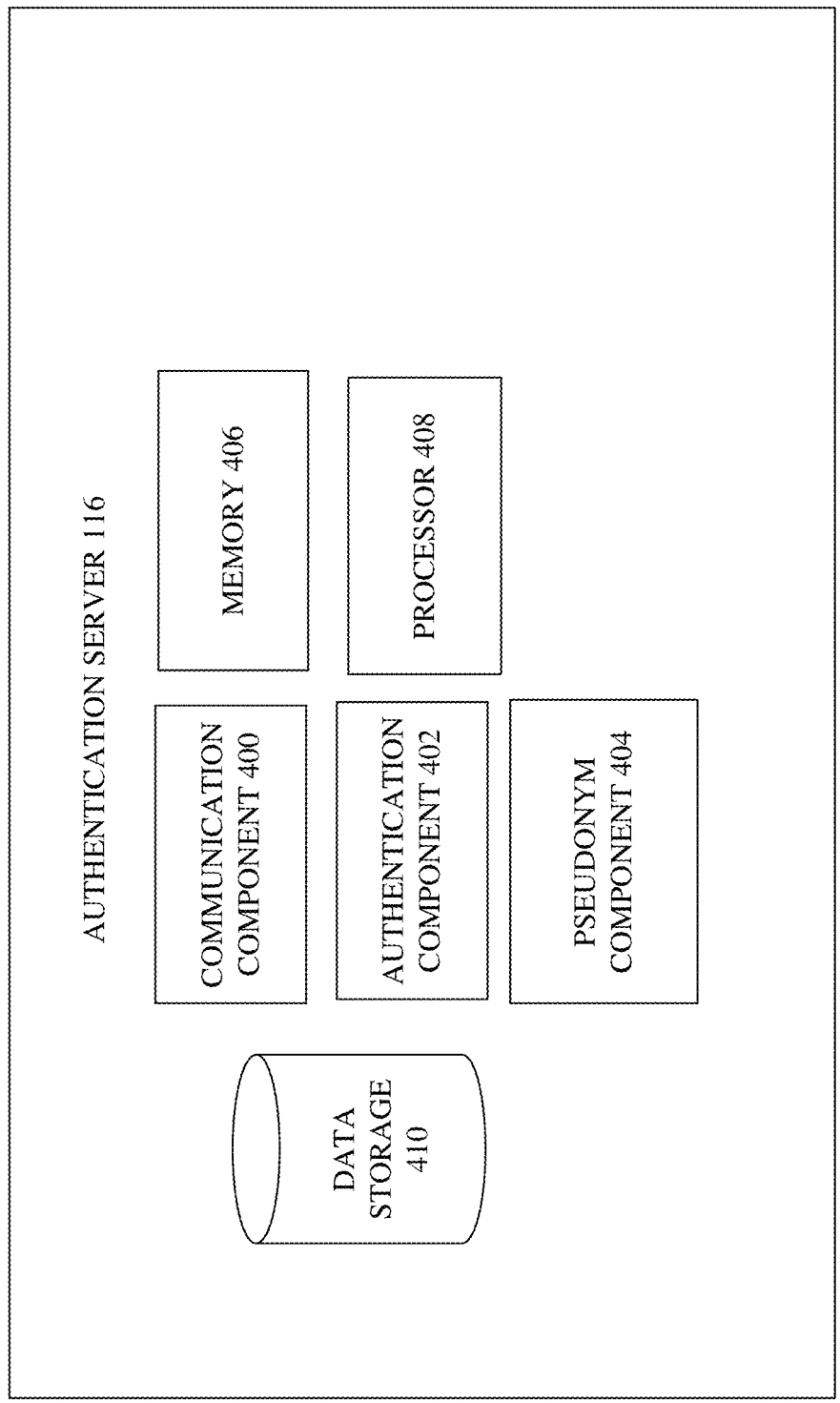
FIG. 4 illustrates an example, non-limiting block diagram of an authentication device that facilitates provisioning of an out-of-band pseudonym over a secure communication channel in accordance with one or more embodiments described herein.
Figure 5:
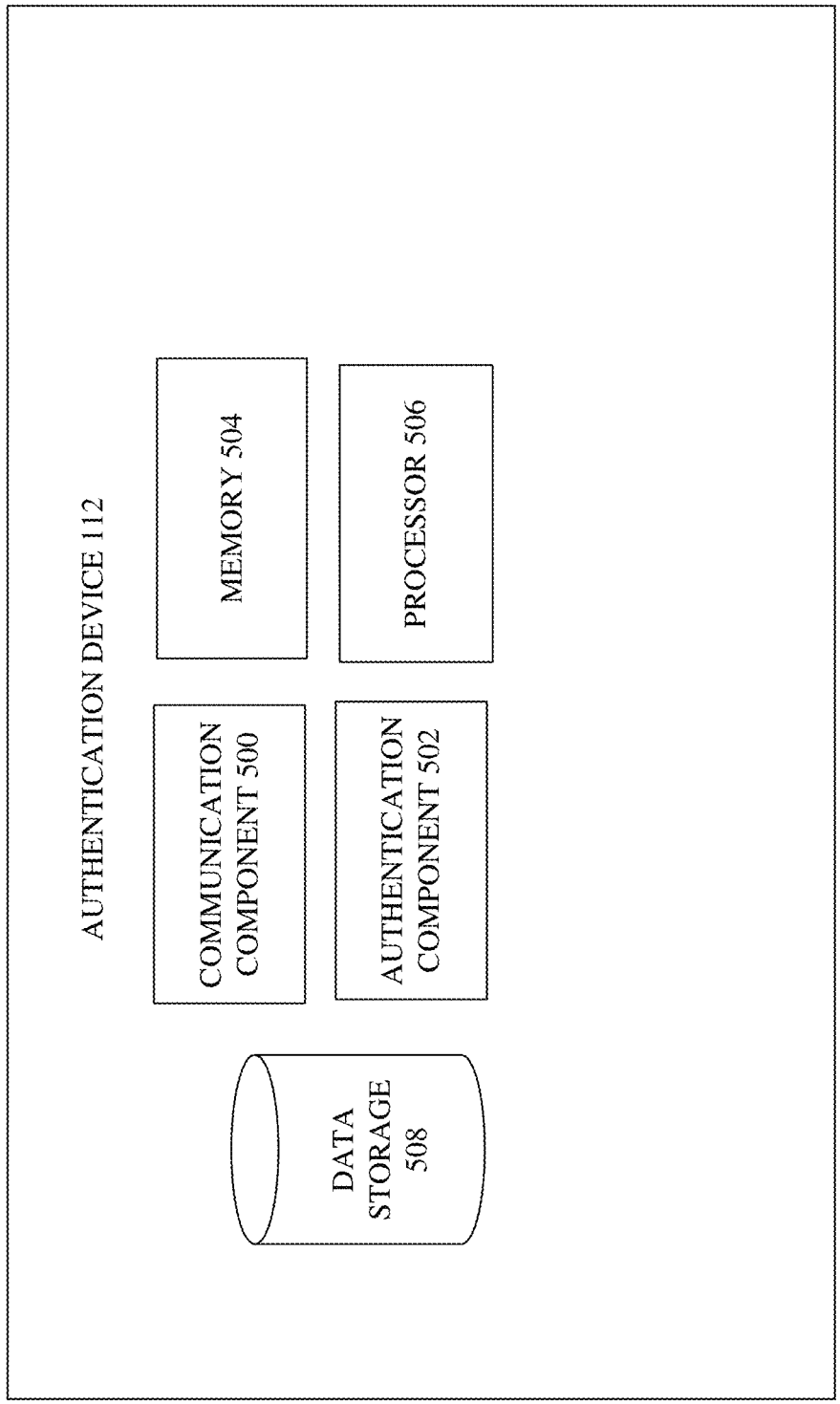
FIG. 5 illustrates an example, non-limiting block diagram of an authentication server that facilitates provisioning of an out-of-band pseudonym over a secure communication channel in accordance with one or more embodiments described herein.

FIG. 1 illustrates an example, non-limiting system (e.g., system 100) that facilitates provisioning of an out-of-band pseudonym over a secure communication channel in accordance with one or more embodiments described herein. FIG. 2 illustrates an example, non-limiting block diagram of mobile device for which an out-of-band pseudonym can be provisioned over a secure communication channel in accordance with one or more embodiments described herein. FIG. 3 illustrates an example, non-limiting block diagram of a secure server that facilitates provisioning of an out-of-band pseudonym over a secure communication channel in accordance with one or more embodiments described herein. FIG. 4 illustrates an example, non-limiting block diagram of an authentication server that facilitates provisioning of an out-of-band pseudonym over a secure communication channel in accordance with one or more embodiments described herein. FIG. 5 illustrates an example, non-limiting block diagram of an authentication device that facilitates provisioning of an out-of-band pseudonym over a secure communication channel in accordance with one or more embodiments described herein. Repetitive description of like elements employed in other embodiments described herein is omitted for sake of brevity.

FIG. 2 shows a device 102, which can include a communication component 200 (which can transmit and/or receive information from and/or to the secure server 104, authentication device 112 and/or the authentication server 116), an identifier component 202, which can store and/or retrieve the permanent (e.g., IMSI) and/or pseudonym for use by the device 102 (in some embodiments, the permanent and/or pseudonym identifiers can be identifiers for a subscriber associated with a device 102 as the device 102 can have multiple associated subscribers, each with a unique permanent identifier and each having an ability to obtain a pseudonym that is unique to the subscriber of the device 102). The device can also comprise a security component 204, which can store and/or generate security information such as but not limited to a password associated with the permanent identifier, an authentication component 206 (which can generate authentication information and/or employ information for authentication of the subscriber of the device 102 with the secure server 104, authentication device 112 and/or authentication server 116). The memory 208 can store computer-executable instructions that can be executed by the processor 210 to perform one or more functions including, but not limited to, generation of password, computation of challenge answers, and/or provisioning of permanent identifier information. One or more different types of information can be stored in the data storage 212. In some embodiments, one or more of the communication component 200, identifier component 202, security component 204, authentication component 206, memory 208, processor 210 and/or data storage 212 can be electrically and/or communicatively coupled to one another to perform one or more functions of device 102.

FIG. 3 shows an example of a secure server 104. The secure server 104 can comprise a communication component 300 (which can transmit and/or receive information such as transmitting one way authentication data, receiving a permanent identifier from the device 102 and/or transmitting a pseudonym to the device 102), the service component 302 can generate information for and/or provide the service facilitated via the web page. For example, secure server 104 can be a web server in some embodiments.

The service component 302 can provide access to one or more web-based services. In some embodiments, the service component 302 can generate a certificate or other evidence of authenticity of the secure server 104 for review by the device 102 (or browser of the device 102).

In some embodiments, the service component 302 can output a pseudonym for a subscriber of the device 102 (e.g., the pseudonym can be generated by the pseudonym component 306 of the secure server 104 in some embodiments) In other embodiments, the pseudonym for the device 102 is generated by the authentication server 116 and provided to the device 102 via the secure server 104 (in exchange for the secure server 104 providing an identifier 108 that is confirmed to be authentic by the authentication server 116).

The secure communication protocol component 304 can implement one or more different security protocols (e.g., HTTPS, IKE and/or IKEv2 or another proprietary or standards-based protocol) for generating a secure communication channel between the secure server 104 and the device 102. The security component 308 can perform encryption and/or decryption with the device 102 employing a private key (or, in some embodiments, a public key) and/or can confirm the login and/or password information provided by the device 102 are authentic and/or correct). The memory 310 can store computer-executable instructions that can be executed by the processor 312 to perform one or more functions of the secure server 104 including, but not limited to, generating a pseudonym 110 for the subscriber for the device 102, providing one way authentication data 107 to the device 102, providing a pseudonym 110 generated by the authentication server 116 for use by the device 102. One or more different types of information can be stored in the data storage 314.

FIG. 4 shows an example authentication server 116 while FIG. 5 shows an example authentication device 112. Repetitive description of like elements employed in other embodiments described herein is omitted for sake of brevity. The authentication device 112 can include the structure and/or functionality of the authentication device 114 of FIG. 1 in various embodiments. The authentication device 112 can comprise a communication component 500 (which can receive the pseudonym from the device 102 in response to a request for an identifier from the authentication device 112, information regarding the authentication of the device 102, can transmit information to the authentication server 116 and the like). The authentication component 502 can generate requests and/or receive information provided for authentication to and/or from the device 102 and/or the authentication server 116. In some embodiments, the authentication component 502 can perform or transmit and/or receive information that can facilitate authentication of the device 102. The memory 504 can store computer-executable instructions that can be executed by the processor 506 to perform one or more functions of the authentication device 112, including, but not limited to, processing a pseudonym 110 (or a pseudonym 124). One or more different types of information can be stored in the data storage 508.

With reference to the authentication server 116, the communication component 400 can transmit and/or receive information (e.g., the authentication server 116 can receive the pseudonym 110 provided by the device 102 to the authentication device 112) while the authentication component 402 can transmit and/or receive information for authentication (e.g., challenge information, keys for encryption and decryption and the like) of the device 102.

The pseudonym component 404 can generate and/or provide a pseudonym 110 for a subscriber for the device 102. For example, in some embodiments, the authentication server 116 can receive the pseudonym 110 for a subscriber for the device 102 and, upon authentication of the device 102, can generate a new pseudonym (e.g., pseudonym 124) for subsequent use by the device 102 at a next authentication device (e.g., authentication device 120). The memory 406 can store computer-executable instructions that can be executed by the processor 408 to perform one or more functions for the authentication server 116. One or more different types of information can be stored in the data storage 410.

Turning now to FIGS. 1, 2, 3, 4 and 5, system 100 can comprise at least a secure server 104 and an authentication server 116, which can be electrically and/or communicatively coupled to one another. The system 100 can also include one or more authentication devices 112, 114 with which the device 102 can attempt authentication. For example, the authentication devices 112, 114 can be devices located at various different locations (e.g., coffee shops, restaurants, bookstores) that can provide Internet access for authenticated devices.

The authentication server 116 can be configured to operate according to any number of different authentication protocols. In some embodiments, the authentication server 116 can retrieve and/or provide one or more different pseudonyms over time to the device 102. For example, a first pseudonym (e.g., pseudonym 110) can be generated for use with a first authentication attempt by the device 102 with authentication device 112. During that authentication attempt, upon the subscriber for the device 102 being authenticated by the authentication server 116, the authentication server 116 can generate a new pseudonym (e.g., pseudonym 124), which can be provided by the authentication server 116. The pseudonym 124 can be employed by the device 102 during a next authentication attempt by the device 102 at another authentication device (e.g., authentication device 114). The process can be repeated. As shown, authentication device 120 can transmit the pseudonym and other information (collectively, information 130) to and/or from the authentication server 116 for authentication of the device 102. Upon authentication of the device 102, the authentication server 116 can generate another pseudonym (not shown) for subsequent access of an authentication device (not shown) by the device 102.

The secure server 104 can be any server configured to be publicly accessible via a webpage and can provide one way authentication data to a device 102 accessing the webpage to prove authenticity of the secure server 104 and setup a secure communication channel with the device 102 (or a browser of the device 102).

With one or more embodiments described herein, the device 102 can generate or initiate an out-of-band communication with the secure server 104 to acquire a pseudonym (e.g., pseudonym 110) before the pseudonym is needed by the authentication server 116 and authentication device 112. If the device 102 does not have a pseudonym, or, if the pseudonym reaches an expiration, the device 102 can obtain a pseudonym (e.g., pseudonym 110, 124) by contacting a well-known, publicly routable and/or publicly accessible interface (e.g., a webpage served by secure server 104). The device can validate the authenticity of the secure server 104 and thereafter securely present the permanent identifier 108 of the device 102 to the secure server 104 thereby reducing or avoiding the likelihood of eavesdropping of the permanent identifier 108 of the device 102 (or of the subscriber of the device 102). In return, the secure server 104 can present to the device 102 a valid pseudonym to be used in a subsequent authentication with the authentication component 112, 114 and/or authentication device 116. In some embodiments, the secure server 104 generates the pseudonym. In other embodiments, the authentication server 116 generates the pseudonym and provides it to the secure server 104, which then passes the pseudonym to the device 102.

In some embodiments, the method can be as follows. The device 102 can contact any publicly available secure server (e.g., a secure server can be a server configured to facilitate webpage communication with the device 102 (or the browser of the device 102) via a secure communication channel). A secure communication channel can be a communication channel encrypted or otherwise secured via the HTTPS protocol, the Internet Key Exchange protocol (or a version thereof) or any other protocol that exists currently or that may be developed in the future to add security to a communication channel between a device (or web browser of a device) and secure server (or a webpage provided via a secure server). In FIG. 1, the secure communication channel 106 can be generated for transmission and/or reception between the device 102 and the secure server 104.

For example, in the embodiment shown in FIG. 1, device 102 can contact secure server 104. As used herein, a secure server can include a server that is configured to provide an authentication of it to identify itself as an authentic system. For example, if the device 102 connects to a webpage served by the secure server 104, the secure server 104 can transmit to the device 102 one way authentication data 107 (e.g., a certificate or other indicator or message that verifies that the secure server 104 is authentic). As used herein, "one way authentication data" can be data transmitted from the secure server 104 (or the webpage provided by the secure server 104) to the device 102 (or to the browser of the device 102) that informs the device 102 that the secure server 104 is authentic.

For example, in some embodiments, the device 102 can contact a secure server (e.g., secure server 104) associated with a particular webpage. The device 102 can request a Hyper Text Transfer Protocol Secure (HTTPS) connection to the webpage. The secure server 104 can then send to the browser of the device 102 the secure socket layer (SSL) certificate. The SSL certificate can include a public key that can be employed to begin a secure session between the device 102 and the secure server 104. The secure session can be facilitated by the secure communication channel 106, which can be encrypted. Accordingly, the secure communication channel 106 can be an encrypted link based on HTTPS in some embodiments.

For example, as shown in FIG. 1, the secure communication channel between the device 102 and the secure server 104 can be secure communication channel 106. Based on this initial exchange, the browser of the device 102 and the secure server 104 providing the website can then initiate an SSL handshake. The SSL handshake involves the generation of shared secrets to establish a uniquely secure communication channel 106 between the device 102 (or the browser of the device 102) and the secure server 104 (or the webpage provided from the secure server 104).

While the embodiment described employs SSL, other embodiments that employ HTTPS, such as Transport Layer Security (TLS), can also be employed and are envisaged within the embodiments described herein. In some embodiments, any security protocol that employs an asymmetric public key infrastructure (PKI) system can be employed and is envisaged herein. An asymmetric system employs two keys to encrypt communications. The two keys include a public key and a private key. Information encrypted with the public key can only be decrypted with the private key and vice versa. The private key can be protected, kept confidential and only accessible by the owner of the private key. In the embodiment described herein, the private key is kept private and securely protected on the secure server 104. Conversely, the public key can be distributed to any number of different devices (e.g., device 102) for use in decryption of the information that was encrypted with the private key and sent by the secure server 104.

After the one-way authentication data 107 is received by the device 102 from the secure server 104, the device 102 can setup a secure communication channel 106 with the secure server 104. After setting up the secure communication channel 106, the identifier 108 for the device 102 can be securely transmitted to the secure server 104 over the secure communication channel 106 with low to no likelihood of eavesdropping by third-parties.

The secure communication channel 106 can be established and the device 102 can transmit to the secure server 104, the identifier 108 for the device 102 (e.g., permanent identifier, such as the IMSI for the device 102), as shown in FIG. 1. While the IMSI is provided as an example of the identifier for the device 102, in various embodiments, any other identifiers for the device 102 and/or subscriber associated with the device 102 can be employed. For example, any confidential information for the subscriber of the device 102 and/or any other information that may be associated with the device 102 and/or that can uniquely identify the device 102 can be employed. In some embodiments, for example, the device 102 can also transmit a password or other information to log in to the secure server 104 or other system for accessing or obtaining a pseudonym 110 for a subscriber for the device 102.

The device 102 can also transmit to the secure server 104 a request 109 for a pseudonym 110 for a subscriber of the device 102. Thus, the request 109 for the pseudonym 110 can be requested as part of out-of-band communication, meaning that the pseudonym 110 is requested (and received) during a transaction with the secure server 104 and not during the (later) authentication attempt by the device 102 with the authentication device 112. Thus, the communication with authentication devices 112, 114 and the authentication server 116 can be considered in-band communication while the communication between the secure server 104 and the device 102 can be considered the in-band communication.

Because the device 102 transmits the request 109 for the pseudonym 110 within the secure communication channel 106 and only sends the identifier 108 for the device 102 to a trusted secure server 104 that has already provided one way authentication data 107 to the secure server 104 (via the one way authentication data 107), the need to transmit the identifier 108 directly to the authentication device 112 later, at the time of authentication, can be eliminated (and therefore there is no disclosure of identifier 108 to an authentication device 112 and/or during the process of authentication via the authentication device 112 and authentication server 116). Privacy and security for the subscriber and device 102 of the subscriber can therefore be greatly enhanced.

After transmitting the identifier 108 over the secure communication channel 106 from the device 102 to the secure server 104, the secure server 104 can communicate the identifier 108 to the authentication server 116 over secure communication channel 118, which can exist between the authentication server 116 and the secure server 104. The authentication server 116 can transmit a pseudonym 110 for a subscriber for the device 102 to the secure server 104. The secure server 104 can transmit the pseudonym 110 to the device 102 over the secure communication channel 106.

Figure 7:
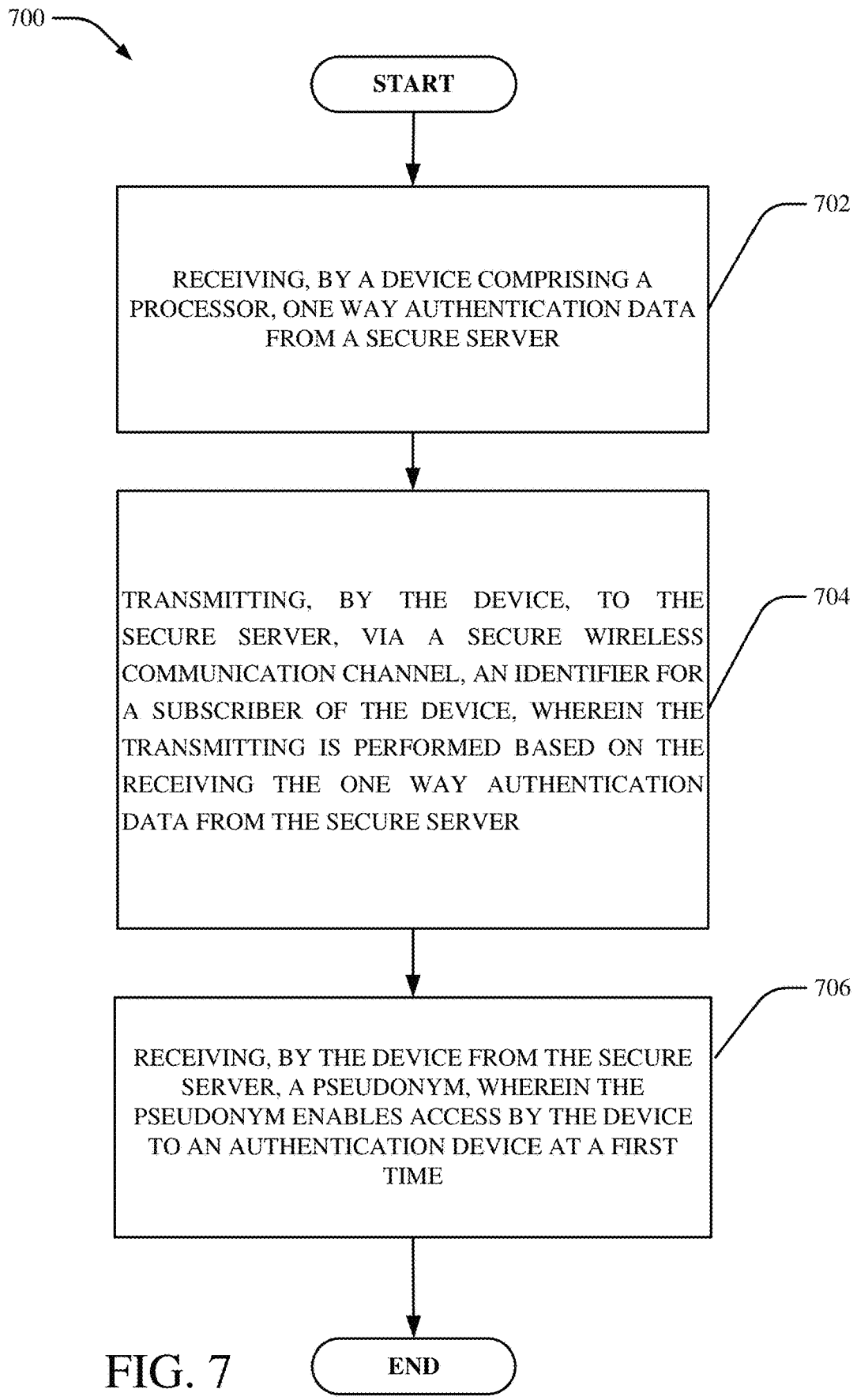
FIGS. 7, 8 and 9 illustrate flow charts of methods facilitating provisioning of an out-of-band pseudonym over a secure communication channel in accordance with one or more embodiments described herein.

The device 102 can employ the pseudonym 110 received via the secure server 104 (in lieu of the true, permanent identifier 108) upon arriving at the authentication device 112 and attempting authentication. The process can proceed as described below with reference to FIG. 10B and as shown in FIG. 7, which provides further detail regarding use of a pseudonym, alias or fake name to an authentication device 112 in lieu of providing a true, permanent identifier for the device 102 to the authentication device 112.

In some embodiments, the secure server 104 can implement a network service such as the AT&T® Secure Entitlement Service or a modified version thereof. In some embodiments, the secure server 104 can provide and/or generate a pseudonym 110 for the device 102 inside a secure communication channel 106 upon receiving a true, permanent identifier (e.g., identifier 108) from the device 102. In some embodiments, the secure communication channel 106 can be an IKE or IKEv2 protected/encrypted channel. In some embodiments, the secure server 104 described herein can provide a webpage, one way authentication data to the device 102 and a secure communication channel between the secure server 104 and the device 102 via any proprietary or standards-based security protocol. All such embodiments are envisaged.

One or more embodiments can be facilitated employing any server that is publicly accessible to the device 102 and that provides one way authentication of the server to the device 102 prior to the device disclosing the identifier 108 (e.g., IMSI) for the device 102 to the secure server 104. In this way, one or more embodiments can include receipt of the pseudonym 110 for the subscriber of the device 102 via an out-of-band communication that is between the device 102 and the secure server 104, and the pseudonym 110 can then be presented to the authentication server 116 and/or authentication device 112, 114 during in-band communication for an authentication attempt with the authentication device 112, 114 and/or the authentication server 116.

In an EAP-AKA authentication, the device starts the EAP conversation by sending the permanent identifier 108 of the device 102 to the authentication server 116. In a first embodiment, the device 102 provides the IMSI directly in an EAP Response/Identity packet or the EAP Response/AKA Identity packet. The IMSI provided is the true identifier (e.g., identifier 108) for the device 102. For EAP over RADIUS (e.g., EAP with a RADIUS system authentication server), this IMSI text can be transmitted in the clear (e.g., unencrypted). For EAP over Internet Key Exchange (IKE) systems (e.g., IKEv2) this IMSI text can be encrypted based on the IKEv2 key exchange, but the transaction may not yet be authenticated, so the IMSI transmission from the device may be vulnerable to Domain Name System (DNS) spoofing.

In a second embodiment, the IMSI (e.g., identifier 108) can be disguised by using standards-based pseudonyms or fake names for the device 102. In various embodiments, the pseudonym 110 can be any fake name or alias. The pseudonym 110 can be changed from time to time. For example, in some embodiments, the pseudonym 110 can be employed for a single access of an authentication device 112 and an updated or different pseudonym (e.g., pseudonym 124) can be received by the device 102 and used for a next access of the same or a different authentication device (e.g., authentication device 120). The pseudonym is specific to the particular authentication device (e.g., in this case, authentication device 112) with which the device 102 is communicating because the authenticating device 112 has to recognize this pseudonym 110. The pseudonym 110 can be issued by the authentication server 116 during in-band communication, which can be communication between the device 102, authentication device 112 and authentication server 116 when needed during the authentication of the device 102 to the authentication device 112 and/or the authentication server 116).

Figure 10A:
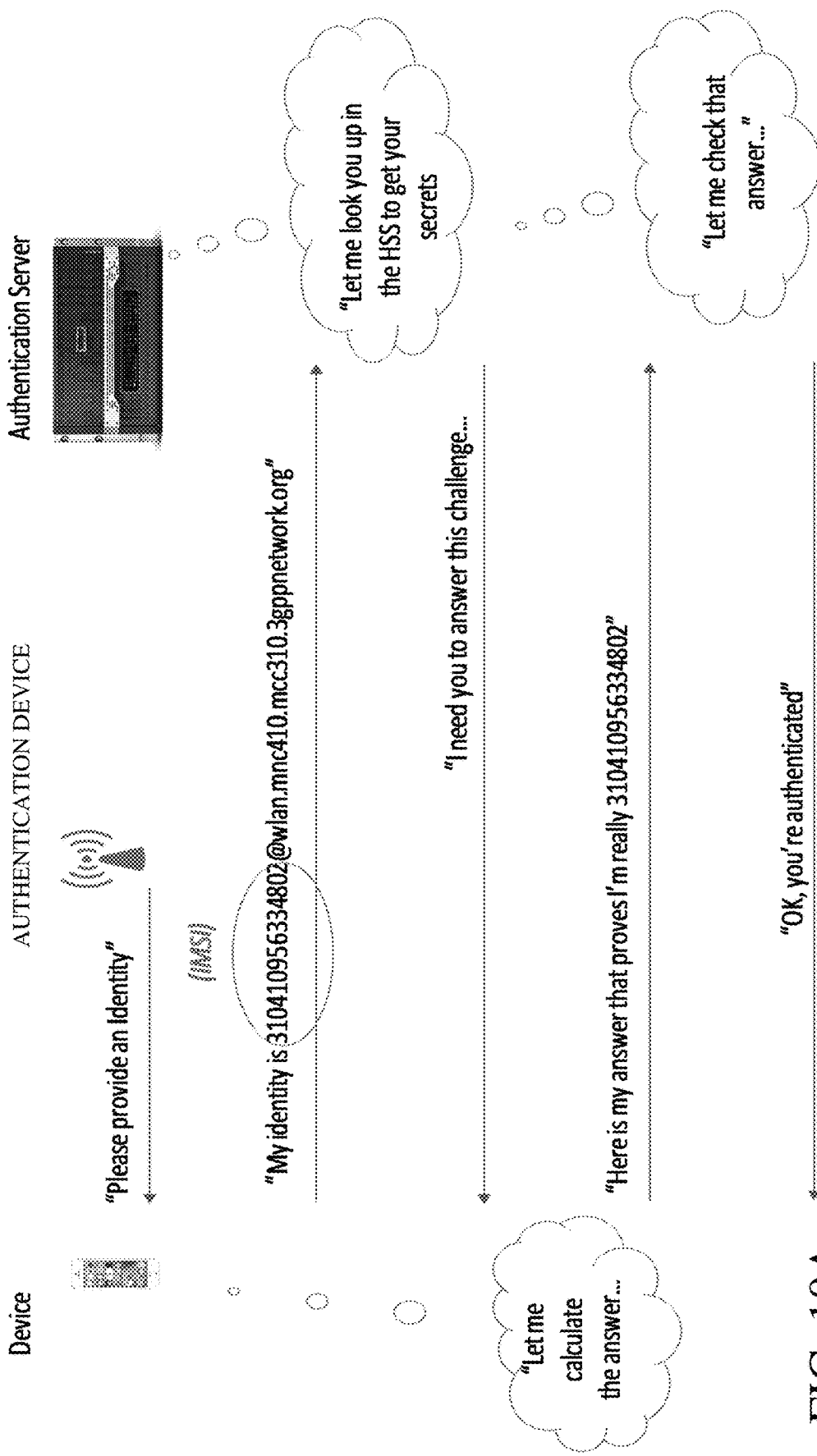
FIGS. 10A, 10B and 10C illustrate flow diagrams of methods of provisioning pseudonyms.
Figure 10B:
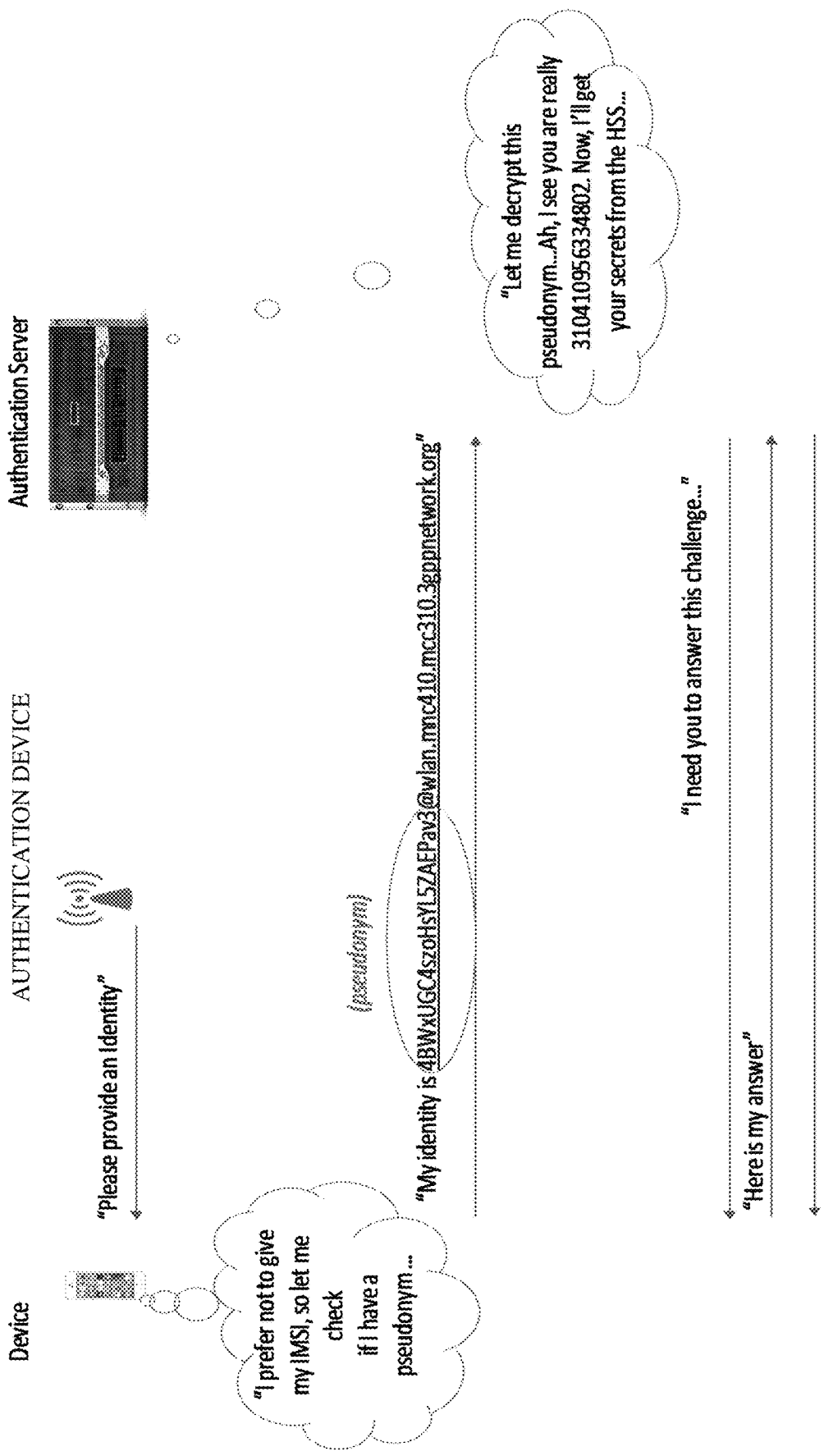
Figure 10C:
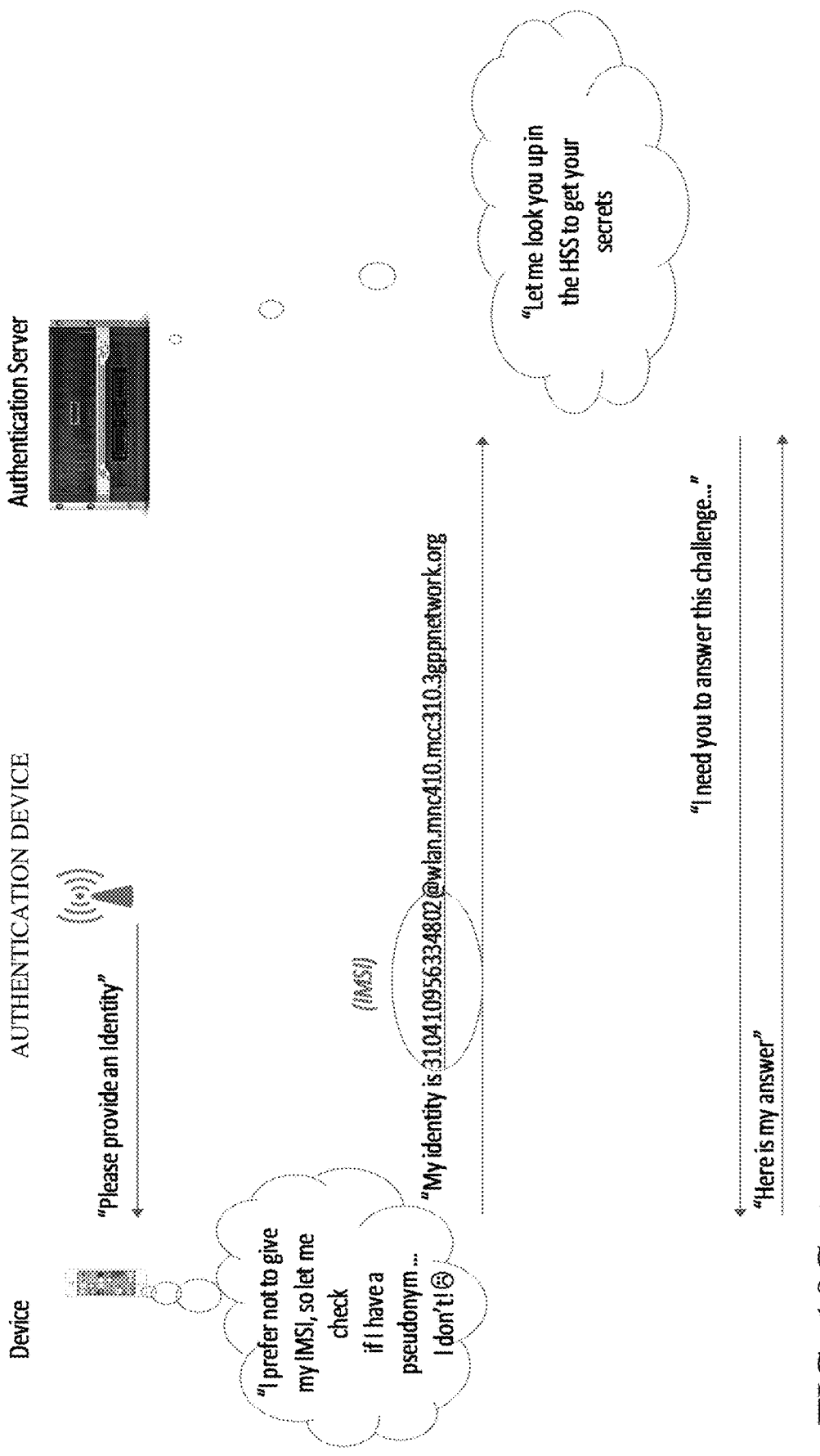

In some embodiments, as shown in FIGS. 10A, 10B and 10C, the pseudonym 110 can be issued via in-band communication (which is communication between the authentication server 116 and the device 102 during the authentication shown in FIG. 10A, 10B or 10C). The device 102 can store the pseudonym 110 (or otherwise access it from a stored location over a network) and can later use the pseudonym 110. Accordingly, in the next round of transmission to the authentication device 112, the device 112 begins by sending a pseudonym (and also shown in FIG. 10B). For EAP-AKA: RFC 4187 and 3GPP TS 33.234, this standard typically requires a secure mechanism for the device 102 to obtain the pseudonym 110.

In yet another embodiment, there can be a proprietary system and/or method between the device 102 and the authentication server 116. In some embodiments, the proprietary method can be distinct from the standards-based method.

The manner in which the device 102 uses an IMSI (or other permanent identifier 108) to authenticate can be as shown in FIG. 10A. As shown, the device (e.g., device 102) can be located in or arrive within a region of coverage of the authentication device (e.g., authentication device 112). The authentication device 112 can request an identity from the device 102. In some embodiments, as shown in FIG. 10A, the device 102 can transmit a message indicating the true identifier 108 of the device 102 to the authentication server 116 to which the authentication device 112 is communicatively and/or electrically coupled. The authentication server 116 can look up the identifier 108 to determine whether the identifier 108 is accurate (and/or to determine secret information associated with the identifier 108, and the secret information can be employed for generating a challenge for the device 102 in some embodiments). In some embodiments, the authentication server 116 can look up the identifier (which can be the IMSI for the device 102) in the HSS. In some embodiments, the information between the authentication device 112 and the authentication server 116 can be information 128 and can include any of the information indicated that is transmitted and/or received to and/or from the authentication server 116, authentication device 112 and/or device 102 in FIGS. 6 and 7.

The authentication server 116 can then transmit a challenge to the device 102. In some embodiments, the authentication server 116 can transmit the pseudonym (e.g., pseudonym 124) for the next authentication (with the next authentication device, for example, authentication device 120) once the challenge is met by the device 102 in the current authentication with authentication device 112 and authentication server 116). Thus, the next pseudonym (e.g., pseudonym 124) can be transmitted as part of in-band communication.

While the embodiments described include that of a new or next pseudonym being issued by the authentication server 116, in some embodiments, there is no time limit necessarily placed on the ability to use the pseudonym (e.g., some pseudonyms may not have an expiration). As such, the pseudonym, alias or fake name can be used indefinitely and repeatedly with one or more different authentication devices in some embodiments. In the case of an EAP-AKA application, the pseudonyms are one-time use only (and the next pseudonym is provided in-band); however, such does not have to be the case and a particular pseudonym can be reused and/or used a single time with an authentication device 112 at any point in time after obtaining the pseudonym (without expiration).

Figure 6:
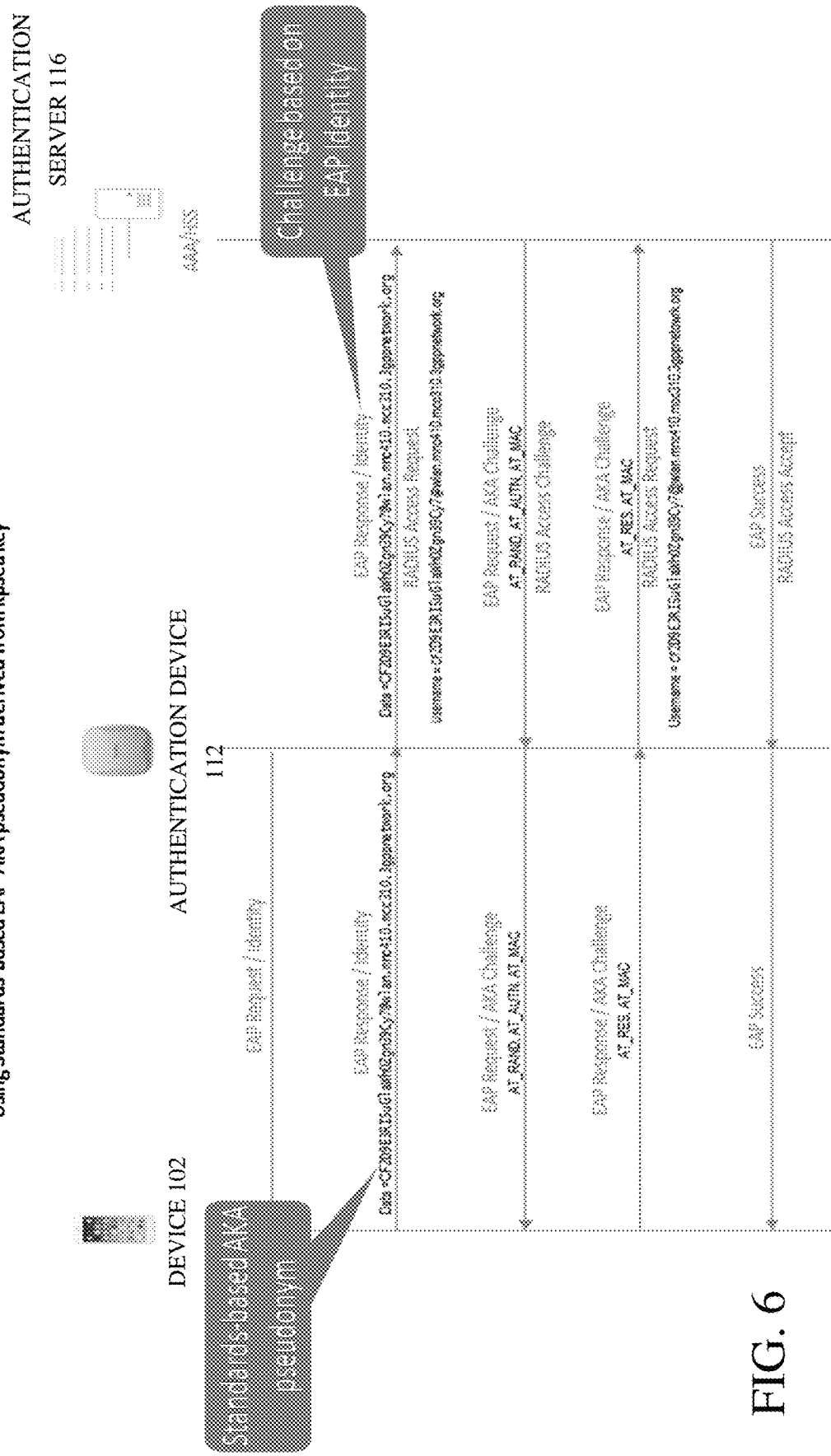
FIG. 6 illustrates an example, non-limiting another system that facilitates provisioning of an out-of-band pseudonym over a secure communication channel in accordance with one or more embodiments described herein.

The device 102 can perform one or more operations (e.g., calculate a value or otherwise) and transmit the result of the operation to the authentication server 116. The authentication server 116 can check the information provided by the device 102. If the information is correct, the authentication server 116 can send to the device 102 (e.g., via the authentication device 112 as shown in FIGS. 6 and 7), a message or other indicator providing notification that the device 102 is authenticated. In some embodiments, there is then a key exchange between the authentication server 116 and the authentication device 112 knows that the device 102 is authenticated. The device 102 and authentication device 112 begin to encrypt information transmitted between the device 102 and the authentication device 112.

The manner in which device 102 uses a pseudonym 110 to authenticate can be as shown in FIG. 10B. As used herein, the term "pseudonym" is interchangeable with the term "fake name." As with the system of FIG. 10A, the device (e.g., device 102) can be located in or arrive within a region of coverage of the authentication device (e.g., authentication device 112). The authentication device 112 can request an identity from the device 102. In lieu of transmitting the identifier of the device 102 to the authentication server 116, the device 102 can transmit a pseudonym. The pseudonym can be transmitted to the authentication server 116 by the device 102. The transmission of the pseudonym by the device 102 can be in-band communication because it is transmitted during the correspondence to authenticate the device 102 shown in FIG. 10B. The authentication server 116 can look up and/or decrypt the pseudonym to determine the true identifier for the device 102 (and/or to determine secret information associated with the identifier—the secret information can be employed for generating a challenge for the device 102 in some embodiments).

The authentication server 116 can then transmit a challenge to the device 102. In some embodiments, the authentication server 116 can transmit the pseudonym for the next authentication (with the next authentication device, for example, authentication device 120) once the challenge is met by the device 102). Thus, the next pseudonym can be transmitted as part of in-band communication.

The device 102 can perform one or more operations (e.g., calculate a value or otherwise) and transmit the result of the operation to the authentication server 116. The authentication server 116 can check the information provided by the device 102. If the information is correct, the authentication server 116 can send to the device 102 a message or other indicator providing notification that the device 102 is authenticated. In some embodiments, there is then a key exchange between the authentication server 116 and the authentication device 112 knows that the device 102 is authenticated and the device 102 and authentication device 112 begin to encrypt information transmitted between the device 102 and the authentication device 112.

As shown in FIG. 10C, in embodiments in which the device does not have a pseudonym (or if the pseudonym is too old to be used, defective or otherwise unable to be used), the device 102 must then provide the true identifier for the device. As used herein, the terms "identifier," "true identifier," "permanent identifier" and/or IMSI are interchangeable.

In some embodiments, a leaked identifier can occur if a client has a pseudonym when the authentication device (e.g., 112) asks for an identity of the device 102 and the device 102 transmits the identifier. This can apply to liberal peer device and conservative peer device implementations.

In some embodiments, leakage can occur if the authentication server 112 deems the pseudonym invalid and requests the device to submit its permanent identifier (e.g., IMSI). A liberal peer device complies with the request while a conservative peer device will typically reject the request, unless the pseudonym has expired. As a result, the device is locked out until the pseudonym expires or is erased (erasing is device dependent).

If a client does not have a pseudonym available when the authentication device 112 asks for an identifier, the device 102 must use its IMSI. This applies to liberal peer device and conservative peer device implementations When a SIM card is newly inserted into the device, it has no pseudonyms available. Typically, in some cases, a pseudonym is only issued by the authentication server after a successful authentication. Therefore it is unavoidable that the IMSI is leaked occasionally in conventional systems and/or approaches.

FIG. 6 illustrates an example, non-limiting another system that facilitates provisioning of an out-of-band pseudonym over a secure communication channel in accordance with one or more embodiments described herein. The alternate approach can be to ensure there is a valid (e.g., standards-based) pseudonym stored on and/or accessible by the device 102 before the device 102 is involved in the authentication with the authentication device 112 such that if an authentication device 112 asks for an EAP Identity, the device 102 has the stored pseudonym to provide. This embodiment can be 3GPP standard compliant and EAP-AKA compliant, employs the device 102 using an out-of-band communication to load valid pseudonyms, does not require that the device 102 securely store a key to encrypt the identifier (e.g., IMSI) as this is a vulnerability because if any device is lost then the key can be known for all devices, and the method does not require PKI infrastructure or revocation infrastructure. One or more embodiments described herein can achieve the same goal (protecting the IMSI) as the previous proposal, but does it in a way that is consistent with particular Evolved Packet Core (EPC) Authentication Architecture, and is compliant with existing standards. In some embodiments, an initial EAP Identity contains encrypted identity using a key, kpseu, that can be employed for encryption. This makes it possible for routing entities to uniquely identify the subscriber in order to route the request to the correct home authentication, authorization and accounting (AAA), requires the Diameter Edge Agent (DEA)/Diameter Routing Agent (DRA) to be enhanced to contain the kpseu key used to encrypt/decrypt pseudonyms, proposal from HPE in 2016 provided this capability to generate and share kpseu keys, Oracle DEA/DRA would need to be enhanced to ingest the kpseu key and decrypt pseudonym prior to routing. No EAP AKA Identity is required. The AAA issues AKA Challenge directly based on EAP Identity without requiring EAP AKA Identity. Although specific types of keys and messages are described with reference to FIG. 6, in other embodiments, any suitable substitute key type and/or message content, format or flow can be provided and are envisaged.

Although the method of FIG. 6 describes providing the device 102 the pseudonym before it is needed, in some embodiments, the device 102 can begin authentication with the authentication device 112 and the authentication device 112 can request an identifier from the device 102. If the device 102 realizes its stored pseudonym is of no use (e.g., expired or otherwise unable to be able to be used) or for some reason the device 102 does not have a pseudonym (e.g., perhaps the subscriber for the device 102 did not seek the pseudonym prior to attempting to access the authentication device 112) the device 102 can start a new process by contacting the publicly available server (e.g., secure server 104) and obtaining the one way authentication data and proceeding with providing the identifier 108 (and, in some embodiments, password) along with a request for pseudonym 110. As such, in some embodiments, the device 102 can initiate and conduct an out-of-band communication with the secure server 104 after attempting to authenticate with the authentication device 112 and realizing the pseudonym 110 for the subscriber of the device 102 cannot be used (or that the device subscriber does not have a pseudonym 110). In these embodiments, the device 102 subscriber obtains an initial pseudonym 110 for accessing an authentication device 112 via an out-of-band communication with a secure server 104 and employs the pseudonym 110 in the in-band communication between the device 102, authentication component 112 and the authentication server 116.

Turning now to FIG. 10C, as with the system of FIGS. 10A and 10B, the device (e.g., device 102) can be located in or arrive within a region of the authentication device (e.g., authentication device 112). The authentication device 112 can request an identity from the device 102. In lieu of transmitting the identifier of the device 102 to the authentication server 116, the device 102 can attempt to transmit a pseudonym (e.g., pseudonym). However, in this embodiment, no pseudonym is available for transmission for one or more reasons. Thus, the device 102 transmits the true identifier for the device 102 to the authentication server 116 as with the approach shown in FIG. 10A. Thus, leakage of the true identifier (e.g., IMSI) is possible. This approach is employed by all current standards.

The authentication server 116 can look up the identifier to determine whether the identifier is accurate (and/or to determine secret information associated with the identifier—the secret information can be employed for generating a challenge for the device 102 in some embodiments). In some embodiments, the authentication server 116 can look up the identifier (which can be the IMSI for the device 102) in the HSS.

The authentication server 116 can then transmit a challenge to the device 102. In some embodiments, the authentication server 116 can transmit the pseudonym for the next authentication (with the next authentication device, for example, authentication device 120) once the challenge is met by the device 102). Thus, the next pseudonym can be transmitted as part of in-band communication.

The device 102 can perform one or more operations (e.g., calculate a value or otherwise) and transmit the result of the operation to the authentication server 116. The authentication server 116 can check the information provided by the device 102. If the information is correct, the authentication server 116 can send to the device a message or other indicator providing notification that the device 102 is authenticated. In some embodiments, there is then a key exchange between the authentication server 116 and the authentication device 112 knows that the device 102 is authenticated and the device 102 and authentication device 112 begin to encrypt information transmitted between the device 102 and the authentication device 112.

Figure 8:
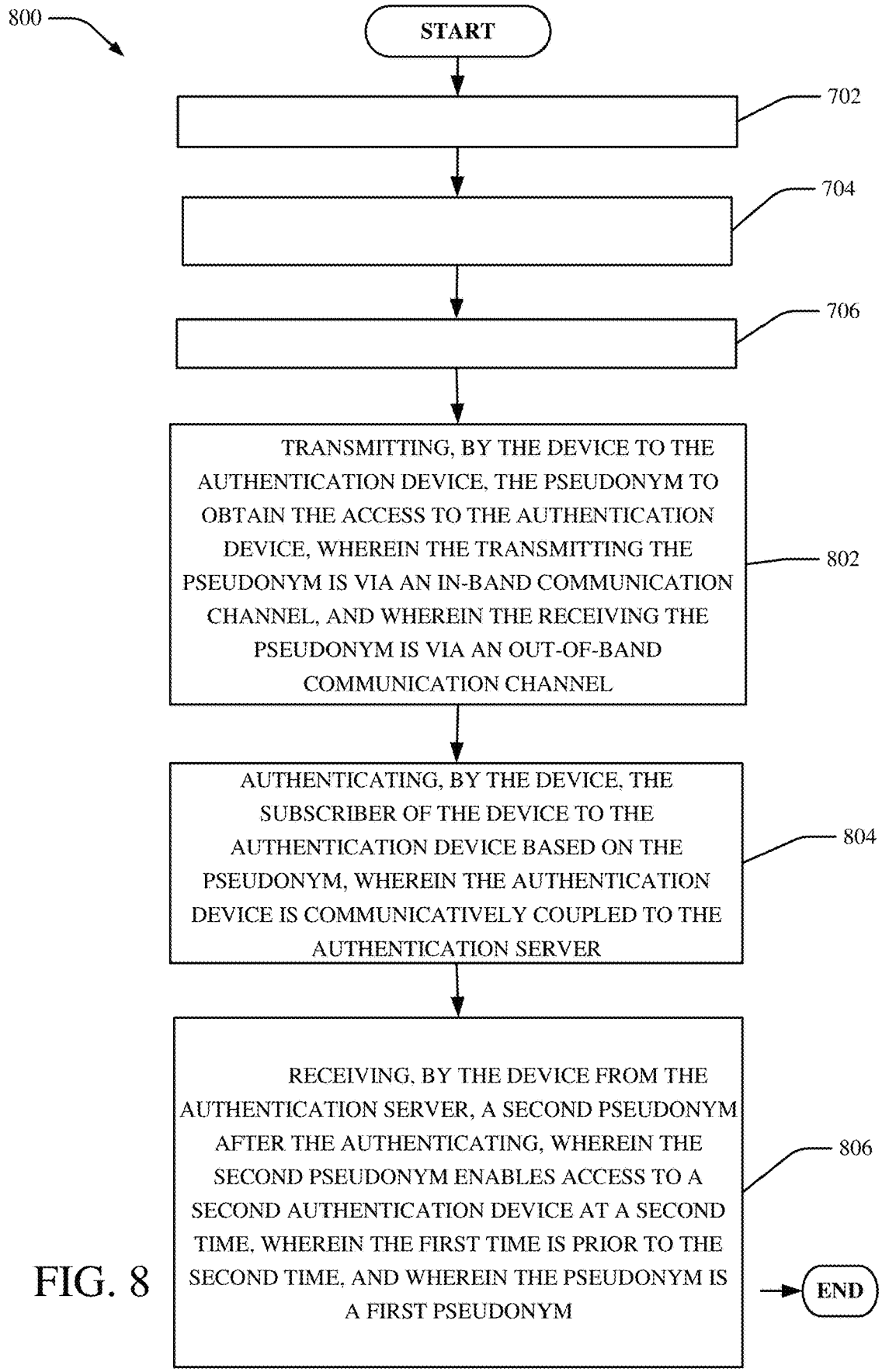
Figure 9:
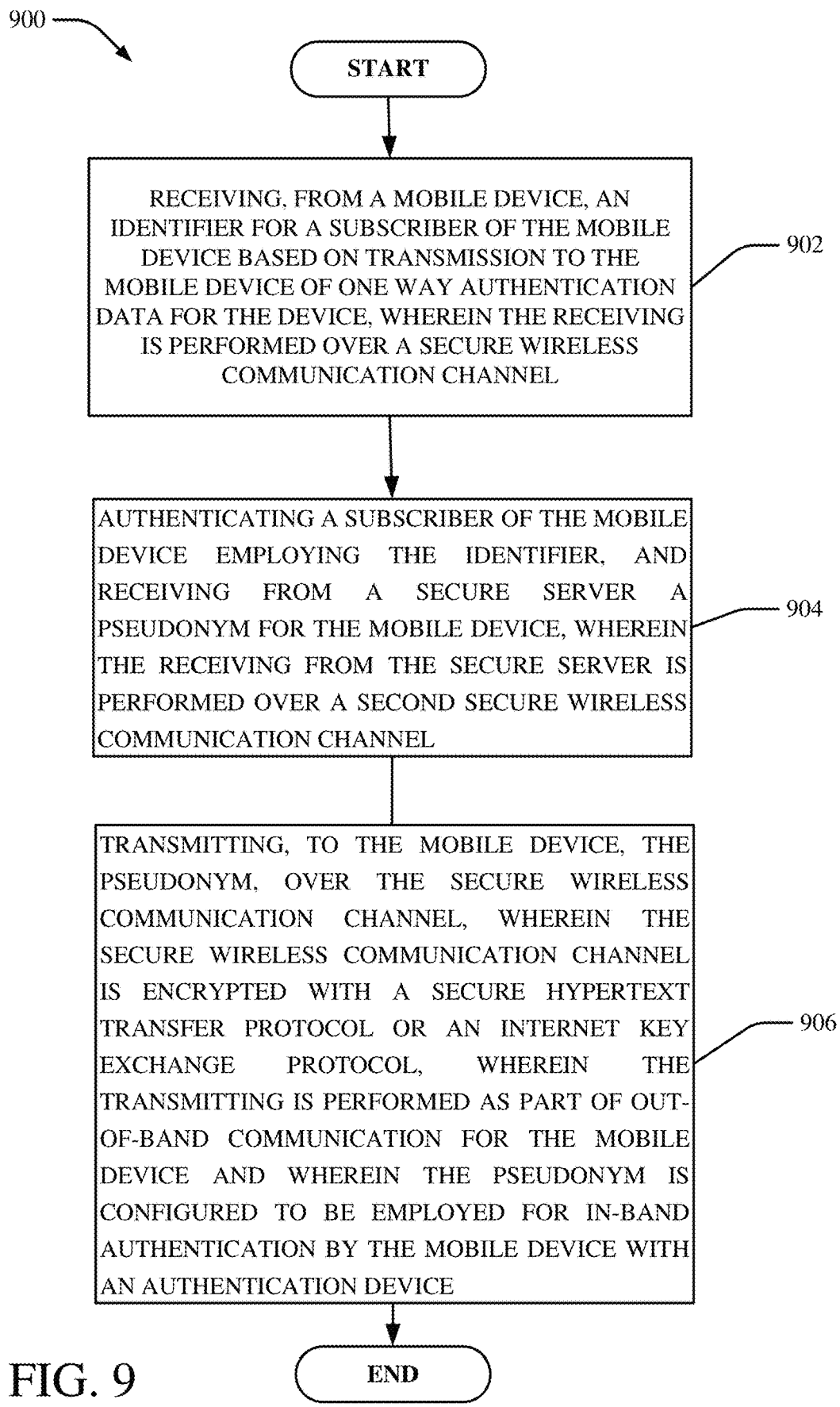

FIGS. 7, 8 and 9 illustrate flowcharts of methods facilitating provisioning of an out-of-band pseudonym over a secure communication channel in accordance with one or more embodiments described herein. At 702, method 700 can comprise receiving, by a device comprising a processor, one way authentication data from a first secure server. At 704, method 700 can comprise transmitting, by the device, to the secure server, via a secure communication channel, an identifier for a subscriber of the device, wherein the transmitting is performed based on the receiving the one-way authentication data from the secure server. In some embodiments, the identifier comprises an international mobile subscriber identifier (IMSI).

At 706, method 700 can comprise receiving, by the device from the secure server, a pseudonym for the subscriber of the device, wherein the pseudonym enables access by the device to an authentication device at a first time.

In some embodiments, the secure communication channel is a first secure communication channel, and wherein the pseudonym is generated by an authentication server communicatively coupled to the secure server via a second secure communication channel.

Turning now to FIG. 8, method 800 can comprise 702, 704 and 706 of method 700. At 802, method 800 can comprise transmitting, by the device to the authentication device, the pseudonym to obtain the access to the authentication device, wherein the transmitting the pseudonym is via an in-band communication channel, and wherein the receiving the pseudonym is via an out-of-band communication channel. At 804, method 800 can comprise authenticating, by the device, a subscriber of the device to the authentication device based on the pseudonym, wherein the authentication device is communicatively coupled to the authentication server.

In some embodiments, the pseudonym is a first pseudonym and, at 806, method 800 can comprise receiving, by the device from the authentication server, a second pseudonym after the authenticating, wherein the second pseudonym enables access to a second authentication device at a second time, wherein the first time is prior to the second time.

With reference to FIGS. 7 and 8, in some embodiments, the secure communication channel is encrypted via a secure hypertext transfer protocol. In some embodiments, the secure communication channel is encrypted via an Internet key exchange protocol. In some embodiments, the secure server is a publicly accessible secure server. In some embodiments, the publicly accessible secure server that implements secure entitlement service.

Turning now to FIG. 9, at 902, method 900 can comprise receiving, from a mobile device, an identifier for a subscriber of the mobile device based on transmission to the mobile device of one way authentication data for the device, wherein the receiving is performed over a secure wireless communication channel. At 904, method 900 can comprise authenticating the subscriber of the mobile device employing the identifier, and receiving from a secure server a pseudonym for the mobile device, wherein the receiving from the secure server is performed over a second secure wireless communication channel. At 906, method 900 can comprise transmitting, to the mobile device, the pseudonym, over the secure wireless communication channel, wherein the secure wireless communication channel is encrypted with a secure hypertext transfer protocol or an Internet key exchange protocol, wherein the transmitting is performed as part of out-of-band communication for the mobile device and wherein the pseudonym is configured to be employed for in-band authentication by the mobile device with an authentication device.

In some embodiments, although not shown in method 900, the operations further comprise: transmitting, to the second device, the pseudonym, via the secure communication channel, and wherein the secure communication channel is encrypted with a secure hypertext transfer protocol or an Internet key exchange protocol. In some embodiments, the transmitting is performed as part of out-of-band communication for the second device and wherein the pseudonym is configured to be employed for in-band authentication by the second device with an authentication device. In some embodiments, the first device comprises a publicly accessible secure server that implements secure entitlement service.

Although not shown, another method can comprise: obtaining one way authentication data from a secure server; sending, to the secure server, via a secure communication channel, an identifier for a subscriber of the mobile device, wherein the sending is performed based on the obtaining the one-way authentication data from the secure server; and obtaining, from the secure server, a pseudonym, wherein the pseudonym enables access by the device to an authentication device at a first time.

The secure communication channel can be a first secure communication channel, and the pseudonym can be generated by an authentication server communicatively coupled to the secure server via a second secure communication channel. In some embodiments, the operations of the method further comprise: sending, to the authentication device, the pseudonym to obtain the access to the authentication device, wherein the sending the pseudonym is via an in-band communication channel, and wherein the obtaining the pseudonym is via an out-of-band communication channel; and authenticating to the authentication device based on the pseudonym, wherein the authentication device is communicatively coupled to the authentication server.

In some embodiments, the pseudonym is a first pseudonym, and wherein the operations further comprise: obtaining, from the authentication server, a second pseudonym after the authenticating, wherein the second pseudonym enables access to a second authentication device at a second time, and wherein the first time is prior to the second time. In some embodiments, the secure communication channel is encrypted via a secure hypertext transfer protocol. In some embodiments, the secure communication channel is encrypted via an Internet key exchange protocol. In some embodiments, the secure server is a publicly accessible secure server.

Figure 11:
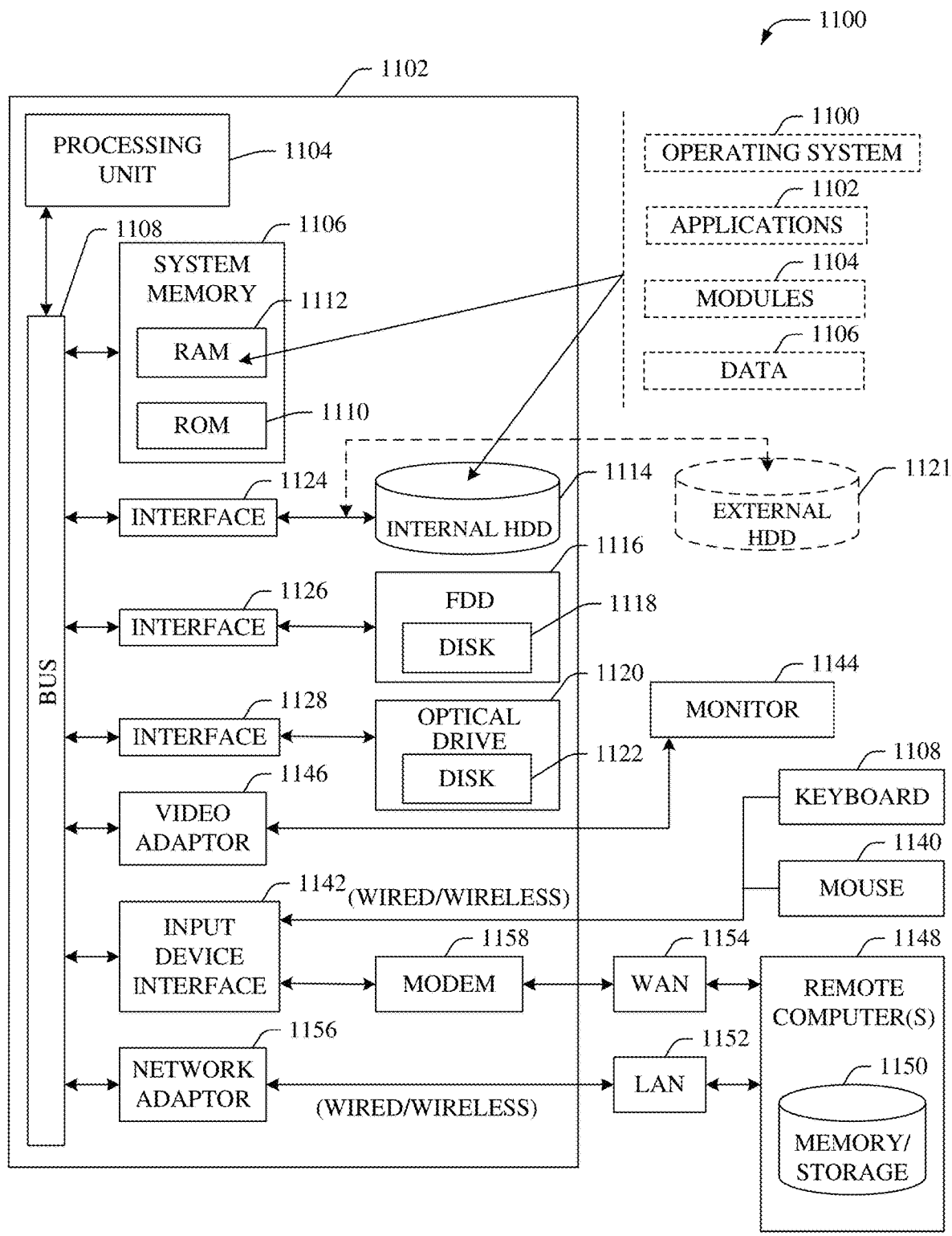
FIG. 11 illustrates a block diagram of a computer that can be employed in accordance with one or more embodiments described herein.

FIG. 11 illustrates a block diagram of a computer that can be employed in accordance with one or more embodiments. Repetitive description of like elements employed in other embodiments described herein is omitted for sake of brevity. In some embodiments, the computer, or a component of the computer, can be or be comprised within any number of components described herein comprising, but not limited to, device 102, authentication device 112, 120, authentication server 116 and/or secure server 104 (or a component of device 102, authentication device 112, 120, authentication server 116 and/or secure server 104).

In order to provide additional text for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 11, the example environment 1100 for implementing various embodiments of the embodiments described herein comprises a computer 1102, the computer 1102 comprising a processing unit 1104, a system memory 1106 and a system bus 1108. The system bus 1108 couples system components comprising, but not limited to, the system memory 1106 to the processing unit 1104. The processing unit 1104 can be any of various commercially available processors. Dual microprocessors and other multiprocessor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1110 (e.g., EIDE, SATA), which internal hard disk drive 1114 can also be configured for external use in a suitable chassis (not shown), a magnetic floppy disk drive 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface, respectively. The interface 1124 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1102, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A communication device can enter commands and information into the computer 1102 through one or more wired/wireless input devices, e.g., a keyboard 1138 and a pointing device, such as a mouse 1140. Other input devices (not shown) can comprise a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a universal serial bus (USB) port, an IR interface, etc.

A monitor 1144 or other type of display device can be also connected to the system bus 1108 via an interface, such as a video adapter 1146. In addition to the monitor 1144, a computer typically comprises other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also comprise a wireless AP disposed thereon for communicating with the wireless adapter 1156.

When used in a WAN networking environment, the computer 1102 can comprise a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A server, comprising:
  a processor; and
  a memory that stores executable instructions that, when executed by the processor, facilitate performance of operations, comprising:
    transmitting one-way authentication data to a user equipment, wherein the one-way authentication data comprises a certificate authenticating the server and a webpage;
    receiving, from the user equipment via a secure out-of-band communication channel that has been established with the user equipment, an identifier associated with the user equipment;
    based on the identifier, obtaining a pseudonym associated with the identifier, wherein obtaining the pseudonym comprises receiving the pseudonym from an authentication server via a secure communication channel that is different from the secure out-of-band communication channel; and
    transmitting the pseudonym to the user equipment via the secure out-of-band communication channel, wherein transmitting the pseudonym enables the user equipment to authenticate to use a service of network equipment via an in-band communication channel.

2. The server of claim 1, wherein the obtaining comprises:
  in response to transmitting the identifier to the authentication server, receiving the pseudonym.

3. The server of claim 1, wherein the obtaining comprises:
  in response to matching the identifier to a group of identifiers authorized to access services of the network, determining the pseudonym.

4. The server of claim 1, wherein the secure out-of-band communication channel is established with the user equipment via an internet key exchange protocol.

5. The server of claim 1, wherein the secure out-of-band communication channel is established with the user equipment via a secure hypertext transfer protocol.

6. The server of claim 1, wherein the identifier comprises an international mobile subscriber identifier.

7. The server of claim 1, wherein the identifier comprises a password associated with a subscriber identity.

8. The server of claim 1, wherein the pseudonym is a first pseudonym that enables the user equipment to authenticate to use the service of the network equipment of the network at a first time, and wherein the operations further comprise:
  transmitting to the user equipment a second pseudonym, wherein the second pseudonym enables access to a second network equipment at a second time, and wherein the first time is prior to the second time.

9. A non-transitory machine-readable medium, comprising executable instructions that, when executed by a processor of a server, facilitate performance of operations, comprising:
  transmitting one-way authentication data to a user equipment, wherein the one-way authentication data comprises a certificate authenticating the server and a webpage;
  receiving, from the user equipment via a secure out-of-band communication channel that has been established with the user equipment based on the one-way authentication data, an identifier associated with the user equipment;
  based on the identifier, obtaining a pseudonym from an authentication server, wherein the pseudonym is associated with the identifier, and wherein obtaining the pseudonym is via a secure communication channel established with the authentication server, wherein the secure communication channel and the secure out-of-band communication channel are different channels; and
  transmitting the pseudonym to the user equipment via the secure out-of-band communication channel, wherein transmitting the pseudonym enables the user equipment to authenticate, via an in-band-communication channel, to use a service of network equipment via a network.

10. The non-transitory machine-readable medium of claim 9, wherein the operations further comprise:
  in response to transmitting the identifier to the authentication server via the network, receiving the pseudonym.

11. The non-transitory machine-readable medium of claim 9, wherein the obtaining the pseudonym comprises:
  in response to matching the identifier to a group of identifiers authorized to access services of the network, determining the pseudonym.

12. The non-transitory machine-readable medium of claim 9, wherein the secure communication channel is established with the user equipment via an internet key exchange protocol.

13. The non-transitory machine-readable medium of claim 9, wherein the secure communication channel is established with the user equipment via a secure hypertext transfer protocol.

14. The non-transitory machine-readable medium of claim 9, wherein the identifier comprises an international mobile subscriber identifier.

15. The non-transitory machine-readable medium of claim 9, wherein the authentication server is a first authentication server, wherein the pseudonym is a first pseudonym that enables the user equipment to authenticate to use the service of the network equipment of the network at a first time, and wherein the operations further comprise:

transmitting to the user equipment a second pseudonym, wherein the second pseudonym enables access to a second authentication server at a second time, and wherein the first time is prior to the second time.

16. A method, comprising:

transmitting, by an authentication server comprising a processor, one-way authentication data to a user equipment, wherein the one-way authentication data comprises a certificate authenticating the authentication server and a webpage;

receiving, from the authentication server, an identifier associated with the user equipment received via a server that has established a secure out-of-band communication channel with the user equipment;

matching, by the authentication server, the identifier to a subscriber identity in a subscriber database;

determining, by the authentication server, a pseudonym for the user equipment based on an authentication device communicably coupled to the user equipment; and facilitating, by the authentication server, transmitting the pseudonym to the server that has established the secure out-of-band communication channel with the user equipment, wherein facilitating the transmitting the pseudonym to the server is via a secure communication channel, and wherein the server provides the pseudonym to the user equipment via the secure out-of-band communication channel different from the secure communication channel.

17. The method of claim 16, wherein the authentication device is a first authentication device, wherein the pseudonym is a first pseudonym that enables the user equipment to authenticate to use a network service of the first authentication device at a first time, and wherein the method further comprises:

transmitting, by the authentication server, a second pseudonym to the server, wherein the second pseudonym enables access to a second authentication device at a second time, and wherein the first time is prior to the second time.

18. The method of claim 16, wherein the identifier comprises an international mobile subscriber identifier.

19. The method of claim 16, further comprising, verifying, by the authentication server, that the identifier is accurate based on looking up the identifier in a home subscriber server data store.

20. The method of claim 16, wherein the identifier comprises a password associated with a subscriber identity.

* * * * *